United States Patent
Kashima et al.

(10) Patent No.: US 7,860,395 B2
(45) Date of Patent: Dec. 28, 2010

(54) OPTICAL ACCESS NETWORK SYSTEM

(75) Inventors: Masayuki Kashima, Tokyo (JP); Hideyuki Iwamura, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 856 days.

(21) Appl. No.: 11/700,008

(22) Filed: Jan. 31, 2007

(65) Prior Publication Data

US 2007/0177874 A1 Aug. 2, 2007

(30) Foreign Application Priority Data

Feb. 2, 2006 (JP) ............................. 2006-026341
Feb. 2, 2006 (JP) ............................. 2006-026342

(51) Int. Cl.
*H04J 14/00* (2006.01)

(52) U.S. Cl. .............................. 398/78; 398/77; 398/89; 370/319; 370/320; 370/335; 370/342; 370/441

(58) Field of Classification Search ................ 370/320, 370/355, 342, 341; 398/77
See application file for complete search history.

(56) References Cited

U.S. PATENT DOCUMENTS

| | | | | |
|---|---|---|---|---|
| 5,025,456 A | * | 6/1991 | Ota et al. ..................... | 375/318 |
| 5,426,670 A | * | 6/1995 | Leppanen et al. ........... | 375/343 |
| 5,610,907 A | * | 3/1997 | Barrett ........................ | 370/342 |
| 5,793,907 A | * | 8/1998 | Jalali et al. .................. | 385/24 |
| 5,923,701 A | * | 7/1999 | Nakamura ................... | 375/142 |
| 5,960,033 A | * | 9/1999 | Shibano et al. ............. | 375/152 |

(Continued)

FOREIGN PATENT DOCUMENTS

| | | |
|---|---|---|
| CN | 1275004 A | 11/2000 |
| JP | 2000-286825 A | 10/2000 |
| JP | 2001-512919 | 8/2001 |
| JP | 2004-282742 | 10/2004 |
| JP | 2005-033544 | 2/2005 |

OTHER PUBLICATIONS

"Implementation of a TDM Passive Optical Network for Subscriber Loop Applications", Ian M. McGregor et al., J. Lightwave Technology, vol. 7, No. 11, Nov. 1989.

(Continued)

*Primary Examiner*—Ken N Vanderpuye
*Assistant Examiner*—Tanya Ngo
(74) *Attorney, Agent, or Firm*—Rabin & Berdo, P.C.

(57) ABSTRACT

An optical access network system capable of transmitting and receiving high-speed signals and which allows the number of subscribers to be increased without increasing the number of wavelengths used is provided. An optical line terminal and an optical network unit are joined via an optical fiber transmitting line, a star coupler, and a plurality of branching optical fiber transmitting lines. The optical line terminal and optical network unit are constituted comprising an optical processing section and an electrical processing section. The optical processing section comprises a light-emitting element and a light-receiving element. The electrical processing section comprises a transmitting signal processing section that generates an encoded transmitting signal in the form of an electrical signal by encoding a transmitting signal and a receiving signal processing section that obtains a receiving signal by decoding a code-division-multiplexed signal that has been converted from optical-signal form to electrical-signal form by the light-receiving element. The optical access network system is characterized in that the decoding processing circuit that the receiving signal processing section comprises is constituted comprising an analog matched filter and a decision circuit.

1 Claim, 11 Drawing Sheets

U.S. PATENT DOCUMENTS

| | | | |
|---|---|---|---|
| 5,974,038 A * | 10/1999 | Shou et al. | 370/335 |
| 6,301,294 B1 * | 10/2001 | Hara et al. | 375/152 |
| 6,373,881 B1 * | 4/2002 | Mizuguchi et al. | 375/147 |
| 6,426,949 B1 * | 7/2002 | Zhou et al. | 370/342 |
| 6,588,950 B1 | 7/2003 | Pfeiffer | |
| 7,177,364 B2 * | 2/2007 | Harres | 375/261 |
| 7,315,664 B2 * | 1/2008 | Weaver | 385/10 |
| 2001/0055138 A1 * | 12/2001 | Richardson et al. | 359/173 |
| 2002/0027948 A1 * | 3/2002 | Schilling | 375/143 |
| 2002/0155822 A1 * | 10/2002 | Adachi | 455/293 |
| 2003/0091056 A1 * | 5/2003 | Paul Hulme Walker et al. | 370/419 |
| 2003/0156847 A1 * | 8/2003 | Nishiki | 398/161 |
| 2003/0160715 A1 * | 8/2003 | Maeda et al. | 341/144 |
| 2003/0214978 A1 * | 11/2003 | Bois et al. | 370/529 |
| 2004/0057500 A1 * | 3/2004 | Balachandran et al. | 375/138 |
| 2004/0141499 A1 * | 7/2004 | Kashima et al. | 370/380 |
| 2005/0047427 A1 * | 3/2005 | Kashima et al. | 370/441 |
| 2005/0129094 A1 * | 6/2005 | Trutna et al. | 375/146 |
| 2007/0127554 A1 * | 6/2007 | Tamai et al. | 375/141 |
| 2008/0107429 A1 * | 5/2008 | Galli et al. | 398/188 |
| 2009/0220232 A1 * | 9/2009 | Sarashina | 398/77 |
| 2009/0232499 A1 * | 9/2009 | Sarashina et al. | 398/63 |

OTHER PUBLICATIONS

"Fault Localization in WDM Passive Optical Network by Reusing Downstream Light Sources", K. W. Lim, et al., IEEE Photonics Technology Letters vol. 17, No. 12, Dec. 2005.

"Performance Evaluation of a Recurring State Dynamic Digital Matched Filter for DS-CDMA", Rushikesh S. Kalaspurkar, et al., IEEE 2003.

* cited by examiner

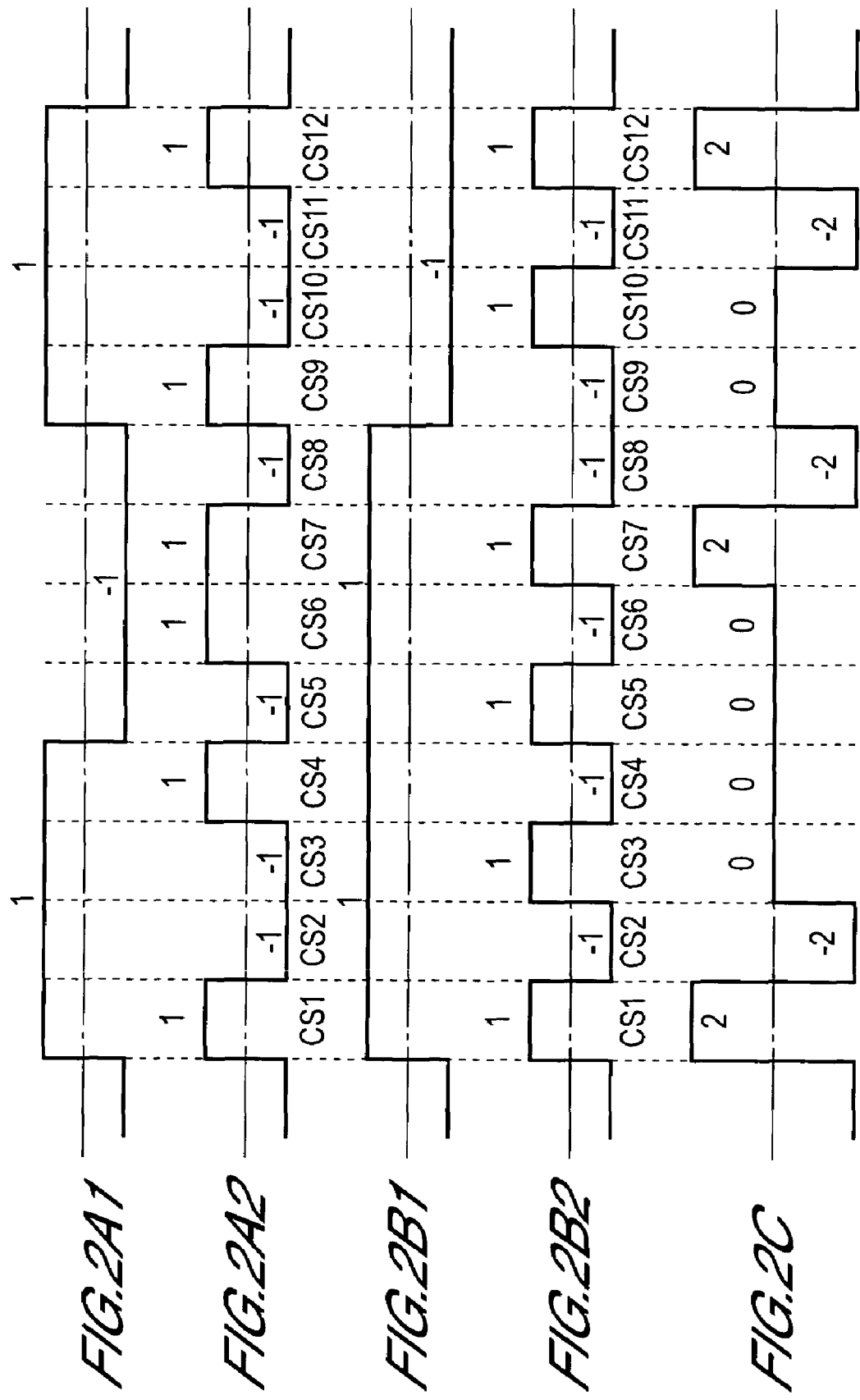

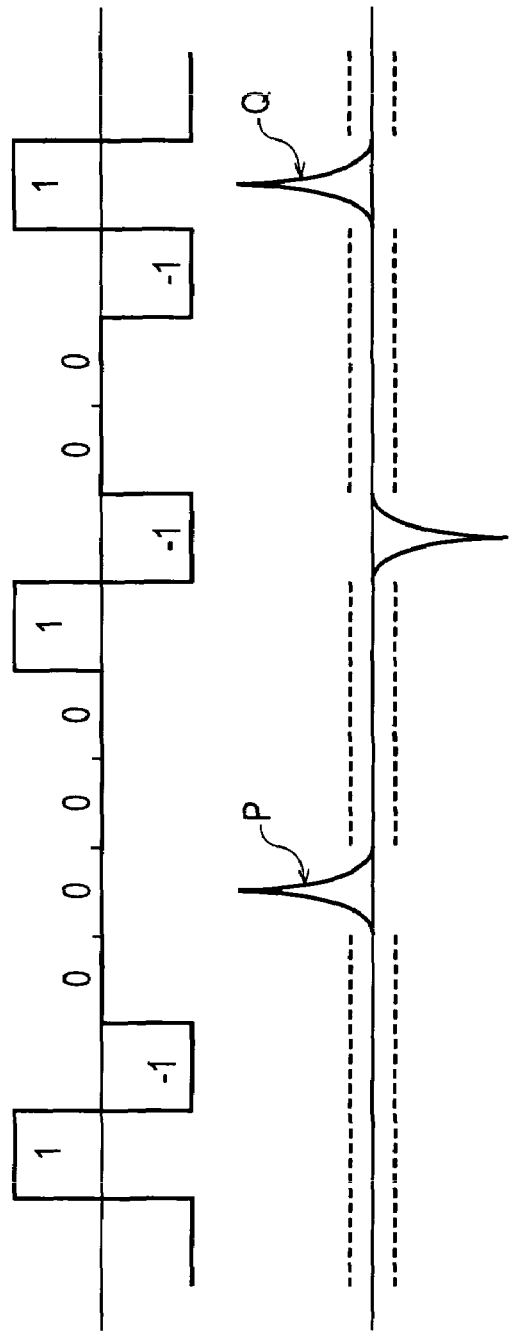
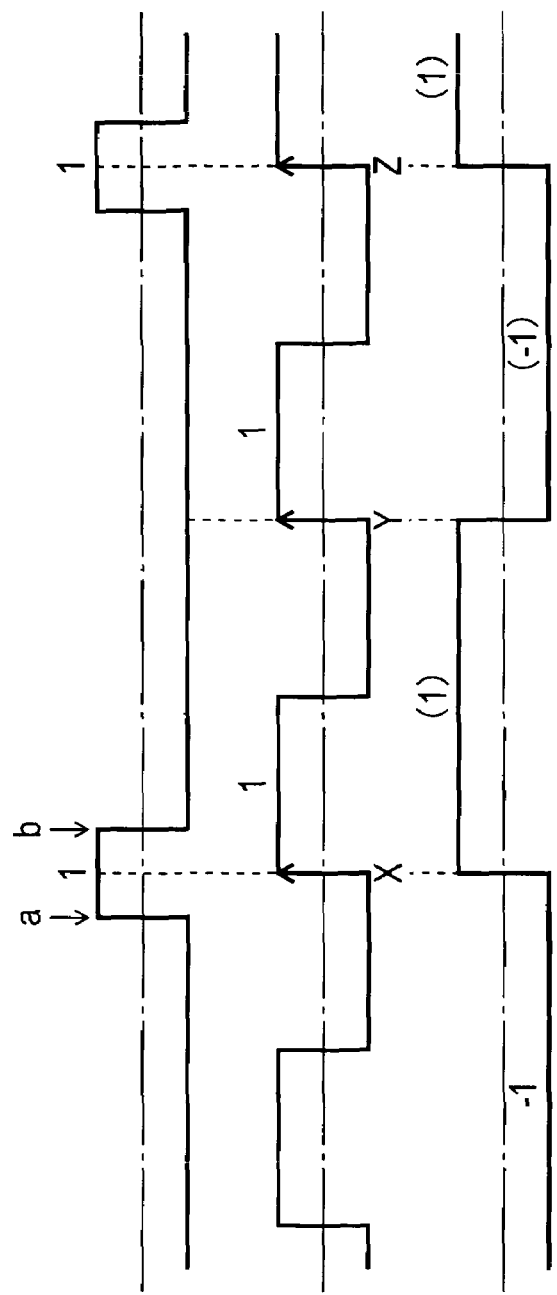
FIG.3A
FIG.3B
FIG.3C1
FIG.3C2
FIG.3D

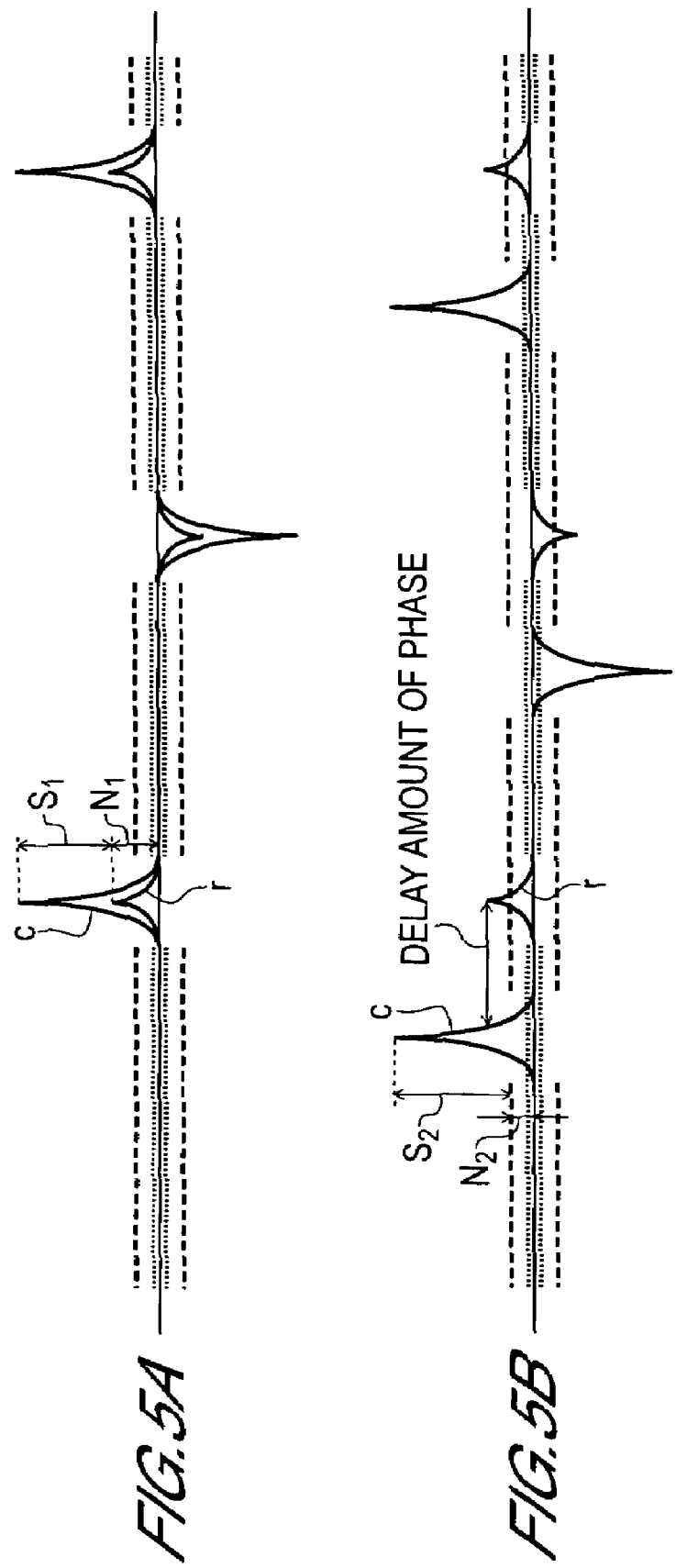

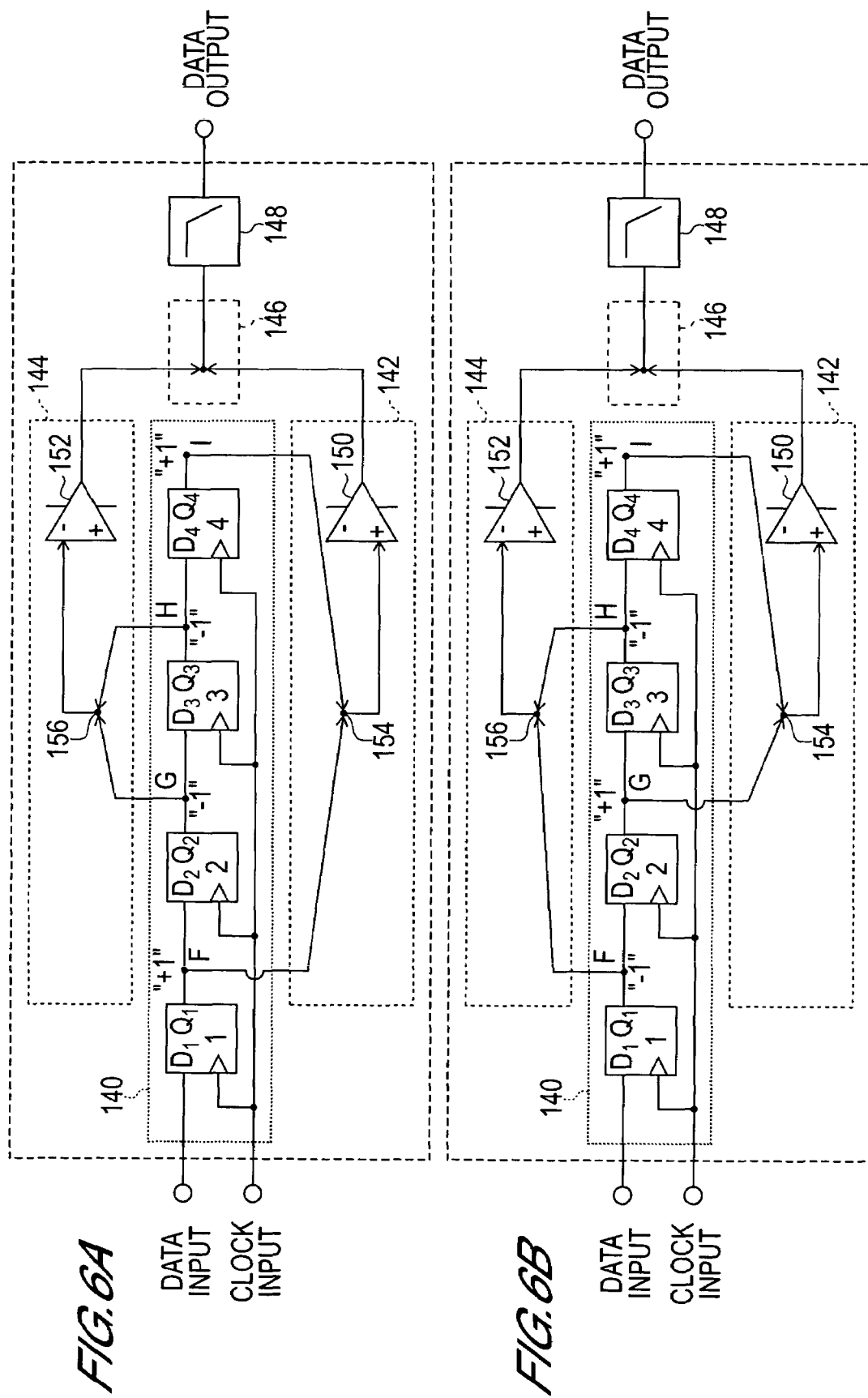

OPTICAL ACCESS NETWORK SYSTEM

BACKGROUND OF THE INVENTION

1. Field of the Invention

The present invention relates to an optical access network system that allows a service provider and a subscriber to communicate by using a CDM (Code Division Multiplexing) system in a PON (Passive Optical Network).

2. Description of Related Art

An optical access network system constituted by connecting a service provider (also called the 'center' hereinbelow) and a plurality of subscribers (also called 'users' hereinbelow) via a PON has attracted attention. In the subsequent description, a service provider-side device is also called an optical line terminal or OLT and a subscriber-side device is also known as an optical network unit or ONU.

A PON is a network that splits a single optical fiber transmitting line into a plurality of optical fiber transmitting lines by connecting a star coupler constituting a passive element midway along the optical fiber transmitting line and which connects a plurality of optical network units in a star shape with the star coupler at the center (See Yokota et al. 'Optical Access System ATM-PON' Oki Electric Research and Development "OKI DENKI KENKYU KAIHATSU", 182nd Edition, Vol. 67, No. 1, April 2000, for example). By adopting a PON as the network linking the center and users, the optical fiber transmitting line between the center and star coupler can be shared by a plurality of users, whereby equipment costs can be suppressed.

In a conventional optical access network system that utilizes a PON, users allocated to the respective transmitting lines are identified by adopting a time division multiplexing (TDM) system and controlling the time slots of the TDM signals (See Ian M. McGregor, et al. "Implementation of a TDM Passive Optical Network for Subscriber Loop Applications", J. Lightwave Technology, Vol. 7, No. 11, November 1989, for example). Here, optical signals of different wavelengths are employed for signals from the user to the center (also called 'uplink signals' hereinbelow) and signals from the center to the user (also called 'downlink signals' hereinbelow). This is so that the uplink signals and downlink signals are identified on the basis of a wavelength difference because the uplink and downlink signals share one optical fiber transmitting line. The uplink and downlink signals are separated and multiplexed by an optical bandpass filter and signals between the respective users and the center are multiplexed and demultiplexed by the star coupler.

On the other hand, in an optical access network system that utilizes a PON, methods for transmitting uplink signals by means of WDM (wavelength division multiplexing) have also been investigated (See K. W. Lim, et al. "Fault Localization in WDM Passive Optical Network by Reusing Downstream Light Sources", IEEE Photonics Technology Letters Vol. 17, No. 12, December 2005, for example). However, in order to increase the number of channels multiplexed (number of users here), the wavelength bandwidth that can be used is of a finite width and it is therefore necessary to make narrow the wavelength interval allocated to adjacent channels. In order to make the wavelength interval narrow in this manner, light-source wavelength stability is required and high equipment costs are required in order to secure this stability.

Therefore, the number of wavelengths used is not increased, the number of multiplexed channels is increased, and the transmitting capacity is desirably substantially increased. As one such method, a method that performs communications between a center and users by means of CDM transmitting has been investigated (See Japanese Unexamined Patent Application No. 2001-512919 (corresponding to WO 99/07087), for example).

The communication method disclosed in Japanese Unexamined Patent Application No. 2001-512919 is a method in which an electrical signal that is transmitted is encoded and multiplied and then up-converted to an RF (radio frequency) signal before being converted to an optical transmitting signal. Further, in the passive-type subscriber network disclosed in Japanese Unexamined Patent Application No. 2004-282742, a method in which the electrical signal to be transmitted is encoded and multiplied before being converted to an optical transmitting signal and transmitted is adopted and, in addition, a WDM system is also included and adopted. Here, a method that multiplexes and splits the transmitted optical signals and received optical signals by means of an optical circulator is used and the same wavelength is employed for the transmitted optical signals and received optical signals.

In the case of each of the devices disclosed in Japanese Unexamined Patent Application No. 2001-512919 and Japanese Unexamined Patent Application No. 2004-282742, in order to receive a signal, the receiving signal is multiplied by code synchronized with the transmitting side. A constitutional example of the receiver used for this purpose is disclosed in Rushikesh S. Kalaspurkar, et al. "Performance Evaluation of a Recurring State Dynamic Digital Matched Filter for DS-CDMA", IEEE 2003. In the case of this receiver, an RF signal is converted to a baseband electrical signal before being A/D converted and the receiving signal is obtained through the generation of an auto-correlation waveform by the digital shift register and digital correlation computation device.

Because a CDM system is adopted for the PON, even when the number of wavelengths used increases, the number of multiplexed channels (corresponds with the number of users) can be increased.

However, executing an optical access method using PON that includes a step of encoding and multiplying a transmitted electrical signal, a step of up-converting the signal to an RF signal, and an A/D conversion step by means of an A/D converter produces the following problems. That is, when a case where high-speed signals (high bitrate signals) with a bit rate of 100 Mbit/s are sent and received is described as an example, there are the following difficulties. In this case, the diffusion rate that is required to encode a signal by means of code with a codelength (definition of codelength will appear subsequently) of 16 must be 1.6 Gbit/s at the lowest and, in order to permit up-conversion to an RF signal, a frequency that is on the order of eight times that codelength is required. Hence, a carrier wave of 12.8 GHz or more is required. Therefore, an A/D converter and a digital multiplier that performs code multiplication on the transmitted electrical signal must be allowed to operate at a speed of at least 1 Gbit/s or more. In their current form, an A/D converter and digital multiplier capable of operating at such a high speed are hard to obtain.

Furthermore, in the case of a conventional PON-based optical access network system, light of different wavelengths is used for the uplink and downlink signals in order to prevent the mixing of reflection noise that is produced in an optical connector or the like for a connection with an optical (de) multiplexer provided in the optical transmitting line. Hence, two types of light of different wavelengths are required each time the subscriber terminals are increased by one. Thus, the required number of light components with different wavelengths is very high.

Furthermore, in a PON-based optical access network system that adopts a CDM system, there is the problem that a portion of the transmitting signal transmitted from the ONU is reflected in the optical connector for the connection with the star coupler provided in the optical transmitting line and a portion of the transmitting signal is mixed with the receiving signal received by the ONU as reflection noise. Due to the noise component, a situation where the receiving signal cannot be received correctly by the ONU arises.

There is therefore a method that allocates different wavelengths to the signals transmitted from the ONU to the OLT and the signals transmitted from the OLT to the ONU. According to this method, there is a need to increase two-fold the types of the wavelengths to be allocated to the signals. When the fact that the wavelength resources that can be used in optical communication is finite is considered, an increase in the types of wavelengths used is undesirable.

Further, as means for reducing the intensity of the noise that is mixed with the receiving signals received by the ONU, the usage of an optical connector of small reflectance as an optical connector for a connection with the star coupler provided in the optical transmitting line may be considered. The optical connector has a constitution that makes an optical connection by bringing optical fiber end faces that are to be connected to face one another by performing polishing so that the end faces tilt away from the vertical face with respect to the direction of propagation of light. Such a constitution keeps the amount of attenuation of reflected light at or below 60 dB.

However, a low-reflectance type optical connector is highly expensive and usage thereof in order to connect an ONU, which is a user device, with the star coupler is associated with high equipment costs of the optical access network system, which is undesirable. Because the ONU, which is a user device, is required in a quantity equal to the number of users, the adoption of one high-cost part as the ONU and the required parts that accompany the ONU greatly affects the equipment costs. On the other hand, because there may be one OLT, which is a center-side device, the adoption of a high-cost part hardly affects the equipment costs. Further, although failure of the OLT, which a center-side device, means that the whole system no longer functions, this does not mean that the functions of the whole system fail when an ONU, which is a user device, breaks down. Hence, whereas the low costs of the parts constituting an ONU are an important requirement, the height of the functions of the parts constituting the OLT are an important requirement.

Therefore, an object of the present invention is first of all to provide a PON-based optical access network system that allows high-speed signals to be sent and received.

Furthermore, a second object is to provide a PON-based optical access network system that, even when the number of subscribers increases, does not require an increase in the number of wavelengths used as does a conventional optical system of the same type.

In addition, a third object is to provide a PON-based optical access network system with which there is no reduction in the S/N ratio of the receiving signal even when a reflected light component from the optical connector that is used to connect the star coupler and the ONU is mixed with the receiving signal of the ONU.

SUMMARY OF THE INVENTION

A first invention relates to an optical access network system that performs bidirectional optical communication by means of code division multiplexing between an optical line terminal which is a device that is installed on the service provider side and an optical network unit which is a device that is installed on the user side. An optical line terminal and a plurality of optical network units are joined via an optical fiber transmitting line, a star coupler and a plurality of branching optical fiber transmitting lines. The optical fiber transmitting line has the star coupler provided at one end while the optical line terminal is joined to the other end of the optical fiber transmitting line. Further, the optical fiber transmitting line is split into a plurality of branching optical fiber transmitting lines by the star coupler and one optical network unit is joined to each of the branching optical fiber transmitting lines.

Mutually different codes are allocated to each of the plurality of optical network units and bidirectional optical communication using code division multiplexing is performed between the optical line terminal and the plurality of optical network units. The optical line terminal and the plurality of optical network units each comprise a transmitting signal processing section that generates and outputs an encoded transmitting signal by encoding the transmitting signal and a receiving signal processing section that receives the code-division-multiplexed signal that is transmitted after being code-division-multiplexed and obtains a receiving signal by decoding the code-division-multiplexed signal.

In order to achieve this object, the receiving signal processing section of the optical access network system of the present invention comprises a decoding processing circuit for decoding the code-division-multiplexed signal, the decoding processing circuit comprising an analog matched filter and a decision circuit. Further, the analog matched filter comprises an analog shift register, a positive signal adder, a negative signal adder, an analog adder that adds the output signals from each of the positive signal adder and the negative signal adder, and a lowpass filter.

Furthermore, the transmitting signal processing section preferably comprises a code assignment circuit for encoding a transmitting signal and a delay circuit that is connected downstream of the code assignment circuit and which outputs the encoded transmitting signal after adjusting the phase of the encoded transmitting signal.

The second invention relates to an optical access network system that performs bidirectional optical communications by means of code division multiplexing between an OLT, which is a device that is installed on the service provider side and N(N is a natural number of two or more) ONUs, which are devices that are installed on the user side. First to Nth channels are allocated in order to N ONUs. The OLT and N ONUs are joined via an optical fiber transmitting line, a star coupler, and N branching optical fiber transmitting lines. The optical fiber transmitting line has a star coupler provided at one end, while the OLT is joined to the other end of the optical fiber transmitting line. Further, the optical fiber transmitting line is split into a plurality of branching optical fiber transmitting lines by the star coupler and one ONU is joined to each of the branching optical fiber transmitting lines.

The OLT and N ONUs each comprise a transmitting signal processing section that generates and outputs an encoded transmitting signal by encoding the transmitting signal, and a receiving signal processing section that receives an encoded receiving signal that has been sent encoded and extracts and outputs a receiving signal by decoding the encoded receiving signal.

In order to achieve the above object, in the optical access network system of the present invention, the code that is set for the transmitting signal processing section that the ONU of the kth channel (k is a natural number from 1 to N) comprises differs from the code that is set for the transmitting signal processing section that the OLT, which encodes and outputs a downlink signal for the ONU of the kth channel, comprises.

The transmitting signal processing section that the ONU of the kth channel comprises encodes and outputs an uplink signal which is a signal for transmitting from the ONU of the kth channel to the OLT. On the other hand, the transmitting signal processing section that the OLT comprises encodes and outputs a downlink signal which is a signal for transmitting from the OLT to the ONU of the kth channel.

Furthermore, the code that is set for the transmitting signal processing section that the ONU of the pth channel (p is a natural number from 1 to N) comprises and the code that is set for the transmitting signal processing section that the OLT comprises which encodes and outputs the downlink signal to the ONU of the qth channel (q is a natural number from 1 to N) are preferably set equal. The transmitting signal processing section that the ONU of the pth channel comprises encodes and outputs an uplink signal from the ONU of the pth channel to the OLT. On the other hand, the transmitting signal processing section that the OLT comprises encodes and outputs a downlink signal which is a signal for transmitting from the OLT to the ONU of the qth channel.

However, the sets (p, q) of the natural number p that specifies the pth channel and the natural number q that specifies the qth channel are limited to the sets (1, 2), (2, 3), (3, 4), ... (p, p+1), ... (N−1, N) and (N, 1)N. For example, in the case of an optical access network system of the present invention that comprises four ONU, since N=4, the sets (p, q) of the natural numbers p and q are limited to the four sets (1, 2), (2, 3), (3, 4), and (4, 1).

That is, the code that is set for the transmitting signal processing section that the ONU of the first channel comprises and the code that is set for the transmitting signal processing section that the OLT, which encodes and outputs a downlink signal to the ONU of the second channel, comprises are set equal. The code that is set for the transmitting signal processing section that the ONU of the second channel comprises and the code that is set for the transmitting signal processing section that the OLT, which encodes and outputs a downlink signal to the ONU of the third channel, comprises are set equal. The code that is set for the transmitting signal processing section that the ONU of the third channel comprises and the code that is set for the transmitting signal processing section that the OLT, which encodes and outputs a downlink signal to the ONU of the fourth channel, comprises are set equal. Further, the code that is set for the transmitting signal processing section that the ONU of the fourth channel comprises and the code that is set for the transmitting signal processing section that the OLT, which encodes and outputs a downlink signal to the ONU of the first channel, comprises are set equal. The same is also true in cases where N has a value other than four.

According to the optical access network system of the first invention, the decoding processing circuit provided in the receiving signal processing section comprises an analog matched filter and a decision circuit. The analog matched filter is able to send and receive high-speed signals because same is constituted comprising an analog shift register, a positive signal adder, a negative signal adder, an analog adder, and a lowpass filter. That is, a high-speed signal can be sent and received by transmitting an encoded signal multiplexed as is as a base signal and executing decoding by using an analog matched filter that does not employ an A/D converter in the receiving signal processing section.

Furthermore, because the transmitting signal processing section comprises a delay circuit for adjusting the phase of the encoded transmitting signal, the problem of reflection noise being mixed with the transmitting signal that occurs in the optical connector and so forth for the connection with the optical (de)multiplexer provided in the optical transmitting line can be prevented from occurring. Hence, there is no need to use light of different wavelengths for the uplink and downlink signals and there is no need to increase the required number of light components of different wavelengths.

A code-division-multiplexed signal is decoded in the analog matched filter that the receiving signal processing section comprises. When the peaks of the resulting auto-correlation waveform and cross-correlation waveform are compared, the peak of the cross-correlation waveform is small. Therefore, by shifting, on the time axis, the auto-correlation waveform generated as a result of decoding the transmitting signal and the cross-correlation waveform generated as a result of decoding the reflection noise component produced in the optical connector or the like, a state where the peak of the auto-correlation waveform is easily judged by the decision circuit can be achieved. The state permitting easy judgment denotes a state where the S/N ratio with respect to the peak of the auto-correlation waveform of the decoded output signal output from the analog matched filter is large.

The aforementioned shifting on the time axis of the auto-correlation waveform and cross-correlation waveform can be implemented easily by adjusting the phase of the transmitting signal by means of the delay circuit that the transmitting signal processing section comprises.

According to the optical access network system of the second invention, the code used for the encoding of the uplink signal of the kth channel and the code used to encode the downlink signal of the kth channel are different.

Hence, in the case of the kth channel, even when a portion of the uplink signal component sent from the kth channel to the OLT is reflected by the optical connector and is mixed with the downlink signal sent from the OLT, because the uplink signal and downlink signal are encoded using different code, the uplink signal component is not decoded when the downlink signal is decoded in the ONU of the kth channel. Hence, even when a portion of the transmitting signal transmitted from the ONU is reflected in the optical connector and a portion of the transmitting signal is mixed with the receiving signal received by the ONU as reflection noise, a situation where the receiving signal cannot be received correctly by all the ONUs due to the noise component can be avoided.

As mentioned earlier, because the codes used for encoding the uplink and downlink signals are different for the respective channels, mutually different codes in a quantity equal to the number of channels are newly required. The same effects can also be implemented by means for which the wavelengths of the uplink and downlink signals differ as mentioned earlier. However, large equipment costs are required in order to secure wavelength stability of the light source. In comparison, the preparation of mutually different codes in a quantity equal to the number of channels has the benefit that, in principle, barely any new costs are incurred.

However, because it becomes necessary to increase the codelength in order to prepare a multiplicity of mutually different codes, if possible, a scheme whereby the number of codes to be prepared is increased as little as possible is desirable. This is because increasing the codelength creates the possibility of the need for a new countermeasure such as increasing the communication speed for transmitting and receiving.

That is, the bit rate of the signal transmitted encoded is then high in proportion to the codelength. When the bit rate is high, there is the problem of distortion of the time waveform occurring as a result of wavelength dispersion caused by the transmitting line as the transmitting distance increases. Hence, there is the possibility of the need for a new countermeasure such as a need to install a relay midway along the transmitting line to regenerate the time waveform, for example.

Therefore, the code that is set for the transmitting signal processing section that the ONU of the pth channel (p is a natural number from 1 to N) comprises and the code that is set for the transmitting signal processing section that the OLT, which encodes and outputs a downlink signal to the ONU of the qth channel (q is a natural number from 1 to N), comprises are preferably set equal. Thus, new code is not required while the above condition that the code that is set for the transmitting signal processing section that the ONU of the kth channel comprises and the code that is set for the transmitting signal processing section that the OLT, which encodes and outputs a downlink signal to the ONU of the kth channel, comprises should be mutually different is satisfied.

As mentioned earlier, when the code that is set for the transmitting signal processing section that the ONU of the pth channel comprises and the code that is set for the transmitting signal processing section that the OLT, which encodes and outputs a downlink signal to the ONU of the qth channel, comprises are set equal, the following is implemented.

That is, although the code for encoding the uplink and downlink signals of the first channel are mutually different, the code for decoding the downlink signal of the first channel and the code for encoding the uplink signal of the second channel are the same. Further, although the code for encoding the uplink and downlink signals of the second channel are mutually different, the code for decoding the downlink signal of the second channel and the code for encoding the uplink signal of the third channel are the same. Generally, although the code for encoding the uplink and downlink signals of the (N−1)th channel are mutually different, the code for decoding the downlink signal of the (N−1) th channel and the code for encoding the uplink signal of the Nth channel are the same. Further, although the code for encoding the uplink and downlink signals of the Nth channel are mutually different, the code for decoding the downlink signal of the Nth channel and the code for encoding the uplink signal of the first channel are the same.

Thus, the required number (N) of codes is equal to the number (N) of channels equal to the number of users. Hence, there is no need for new code and the condition that the code used for the encoding of the uplink signal of the kth channel and the code used to encode the downlink signal of the kth channel be different can be satisfied. Hence, by setting code for the transmitting signal processing sections of the respective channels in this way, a situation where the receiving signal cannot be received correctly by all the ONUs can be avoided.

As described earlier, the optical access network system of the second invention provides a PON-based optical access network system in which the S/N ratio of the receiving signal does not drop even when a reflected light component from the optical connector used to connect the ONU and star coupler is mixed with the receiving signal of the ONU. Accordingly, a low-cost optical connector with a large reflected light component can be used to connect the star coupler and ONU, which makes a large contribution toward reducing equipment costs.

BRIEF DESCRIPTION OF THE DRAWINGS

The foregoing and other objects, features and advantages of the present invention will be better understood from the following description taken in connection with the accompanying drawings, in which:

FIG. 2 serves to describe the process whereby a transmitting signal is encoded;

FIG. 3 serves to describe the process whereby a receiving signal is decoded;

FIG. 5 shows the relationship between the receiving signal and the peak position of an auto-correlation waveform in a case where a signal resulting from the mixing of the reflected transmitting signal is decoded, in the optical access network system of the first invention;

FIG. 6 is a schematic block constitutional view of an analog matched filter;

DESCRIPTION OF THE PREFERRED EMBODIMENTS

Figure 1:
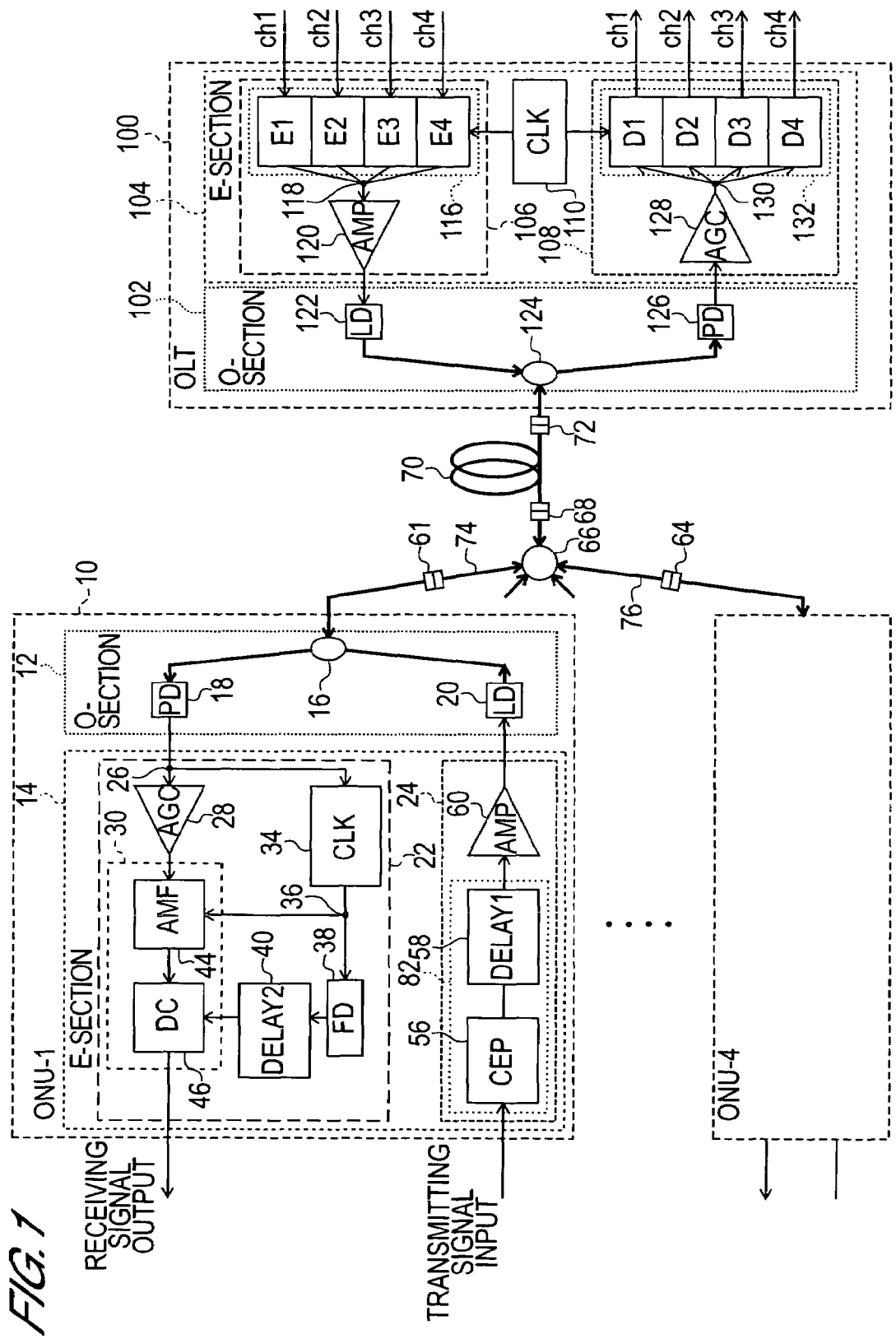
FIG. 1 is a schematic block constitutional view of an optical access network system.

Embodiments of the present invention will be described hereinbelow with reference to the drawings. Further, the respective drawings illustrate a constitutional example of the present invention and merely illustrate schematically the dispositional relationships of the respective constituent elements to an extent permitting an understanding of the present invention. The present invention is not limited to the illustrated examples. Furthermore, although specified materials and conditions and so forth are sometimes used in the following description, these materials and conditions constitute only one suitable example and the present invention is therefore not limited to these materials and conditions. In addition, the same numerals are shown assigned to the same constituent elements in the drawings and repeated descriptions are also sometimes omitted. Further, in the schematic block constitutional view illustrated hereinbelow, the paths of the optical signals of the optical fibers and so forth are indicated by bold lines and the paths of electrical signals are indicated by narrow lines.

Optical Access Network System

The basic constitution and operation of the optical access network system will now be described with reference to FIG. 1. FIG. 1 is a schematic block constitutional view of the optical access network system. The optical access network system shown in FIG. 1 assumes a case where the number of subscribers (number of users) is four, that is, a case where there are four optical network units. However, the following description is equally valid even when there are not four units but rather any number of units.

In FIG. 1, in order to identify the plurality of optical network units, the optical network unit to which a first channel is allocated is represented as ONU-1 and the optical network unit to which a fourth channel is allocated is represented as ONU-4. Although ONU-2 and ONU-3 are not illustrated, ONU-1 to ONU-4 all have the same constitution. When the structure of an optical network unit is described in the subsequent description of the optical access network system, same is generally noted as optical network unit 10'.

The optical access network system is an optical access network system that performs bidirectional optical communication using code division multiplexing between an optical line terminal 100 which is a device that is installed on the service provider side and an optical network unit which is a device that is installed on the user side (ONU-1 to ONU-4 will subsequently appear as optical network units 10'. The optical line terminal 100 and optical network unit 10 are joined via an optical fiber transmitting line 70, a star coupler 66, and a plurality of branching optical fiber transmitting lines.

The optical fiber transmitting line 70 has the star coupler 66 provided at one end thereof and the optical line terminal 100 is joined to the other end of the optical fiber transmitting line 70. Further, the optical fiber transmitting line 70 is split into a plurality of branching optical fiber transmitting lines by the star coupler 66 and one optical network unit is joined to each of the branching optical fiber transmitting lines. In FIG. 1, the optical fiber transmitting line connecting the ONU-1 appears as the 'branching optical fiber transmitting line 74' and the optical fiber transmitting line connecting the ONU-4 appears as the 'branching optical fiber transmitting line 76'. Bidirectional optical communication using code division multiplexing is performed between each of the plurality of optical network units (ONU-1 to ONU-4) and the optical line terminal 100.

The optical network unit 10 is constituted comprising an optical processing section 12 and an electrical processing section 14. The optical processing section 12 comprises a light-emitting element 20 for converting an encoded transmitting signal from an electrical signal form into an optical signal form, and a light-receiving element 18 for converting a code-division-multiplexed signal from an optical signal form into an electrical signal form.

The electrical processing section 14 comprises a transmitting signal processing section 24 for generating an encoded transmitting signal in the electrical signal form by encoding the transmitting signal and a receiving signal processing section 22 for obtaining a receiving signal by decoding a code-division-multiplexed signal converted to the electrical signal form from the optical signal form by means of the light-receiving element 18.

The receiving signal processing section 22 comprises a decoding processing circuit 30 that performs processing for decoding a code-division-multiplexed signal, an auto gain control (AGC) element 28, a clock signal regeneration circuit 34, a frequency divider 38, and a delay circuit 40. Further, the transmitting signal processing section 24 comprises an encoding processing circuit (CEP) 56 and a driver 60. An amplifier (AMP) is used as the driver 60.

Meanwhile, the optical line terminal 100 is constituted, like the optical network unit 10, comprising an optical processing section 102 and an electrical processing section 104. The optical processing section 102 comprises, like the optical processing section 12 of the optical network unit 10, a light-emitting element 122 and a light-receiving element 126. Further, the electrical processing section 104 comprises a transmitting signal processing section 106, a receiving signal processing section 108, and a clock signal generation circuit 110.

The transmitting signal processing section 106 comprises an encoding processing circuit array 116 that comprises parallel encoding processing circuits, and a driver 120. An amplifier is used as the driver 120. The transmitting signals output from each of the encoding processing circuits shown as coding 1 to coding 4 are multiplexed by an electrical signal multiplexer 118 and then input to the driver 120.

Furthermore, the receiving signal processing section 108 comprises a decoded processing circuit array 132 that comprises parallel decoding processing circuits, and an auto gain control element 128. The electrical signal output by the auto gain control element 128 is split by an electrical signal splitter 130 before being input to the respective decoding processing sections shown as decoding 1 to decoding 4 for decoding. A clock signal is supplied from the clock signal generation circuit 110 to the transmitting signal processing section 106 and receiving signal processing section 108. The clock signal that is supplied from the clock signal generation circuit 110 is a reference clock signal of the optical access network system. In the optical network unit 10, this clock signal is extracted from the received code-division-multiplexed signal by the clock signal regeneration circuit 34 and is used to decode the code-division-multiplexed signal.

The optical access network system with the constitution shown in FIG. 1 operates as described below.

First, a downlink signal will be described by taking the first channel as an example. The downlink transmitting signal of the first channel is input to the encoding processing circuit for encoding the transmitting signal (the encoding processing circuit represented as 'coding 1' in the first and second embodiments described subsequently) where the signal is encoded and output as an encoded transmitting electrical signal. The encoded transmitting electrical signal is multiplexed by the electrical signal multiplexer 118 and input to the driver 120 as a code-division-multiplexed electrical signal and amplified. The amplified code-division-multiplexed electrical signal is converted into an optical signal by the light-emitting element 122 that the optical processing section 102 comprises and output as a code-division-multiplexed optical signal. A semiconductor laser, for example, can be used as the light-emitting element 122.

The code-division-multiplexed optical signal is input to the optical processing section 12 of the optical network unit 10 via an optical coupler 124 and optical connector 72 and via an optical fiber transmitting line 70, an optical connector 68, a star coupler 66, and an optical connector 61. The code-division-multiplexed optical signal input to the optical processing section 12 is input to the light-receiving element 18 via the optical coupler 16 that the optical processing section 12 comprises, converted into a code-division-multiplexed electrical signal, and then input to the electrical processing section 14 of the optical network unit 10. A photodiode, for example, can be used as the light-receiving element 18.

The code-division-multiplexed electrical signal input to the receiving signal processing section 22 is split into two by an electrical signal splitter 26, whereupon one of the signals is input to the clock signal regeneration circuit 34 and the other is input to the auto gain control element 28. A clock signal is extracted from the code-division-multiplexed electrical signal that is input to the clock signal regeneration circuit 34. Further, the code-division-multiplexed electrical signal input to the auto gain control element 28 is adjusted as a code-division-multiplexed electrical signal with a fixed voltage value that is set for the auto gain control element 28 irrespective of the intensity of the code-division-multiplexed electrical signal and is then input to the decoding processing circuit 30. The fixed voltage value has a value equal to the input level of the analog shift register constituting the constituent element of an analog matched filter 44 that the decoding processing circuit 30 comprises.

The code-division-multiplexed electrical signal the voltage value of which has been adjusted is first decoded by the analog matched filter 44 that the decoding processing circuit 30 comprises and input to a decision circuit (DC) 46. In the decision circuit 46, only the auto-correlation waveform component of the signal decoded by the analog matched filter 44 is extracted and output. That is, the receiving signal generated from the auto-correlation waveform component is the signal component received by the ONU-1 of the first channel.

As mentioned earlier, the downlink signal, that is, the transmitting signal that is transmitted from the optical line terminal 100 to the optical network unit 10 is transmitted as an encoded and multiplexed code-division-multiplexed optical signal. Further, the code-division-multiplexed optical signal is converted into a code-division-multiplexed electrical signal and decoded in the optical network unit 10. That is, the decoding processing of the optical network unit 10 is executed in an arbitrary electrical signal state.

The features of the optical access network system of the present invention include the electrical processing section that performs encoding of transmitting signals and decoding of receiving signals and the majority of the following description is focused on the description of the operation of the electrical processing section. The signals required in the description of the operation of the electrical processing section are encoded transmitting electrical signals or code-division-multiplexed electrical signals. Hence, in the subsequent description, except when there is a particular requirement to do so, no distinction is made between optical signals and electrical signals. That is, code-division-multiplexed optical signals or code-division-multiplexed electrical signals are written as code-division-multiplexed signals without specifying whether the signals are electrical signals or optical signals.

The uplink signal will be described next by taking the first channel as an example. The transmitting signal of the first channel (shown as 'transmitting signal input' of optical network unit 10 in FIG. 1) is input to the encoding processing circuit 56 provided in the transmitting signal processing section 24 of the electrical processing section 14 of the optical network unit 10 and encoded and output as an encoded transmitting signal. The encoded transmitting signal is input to the driver 60 and amplified and the amplified encoded transmitting signal is converted into an optical signal by the light-emitting element 20 that the optical processing section 12 comprises. A semiconductor laser can be used as the light-emitting element 20.

The encoded transmitting signal is input to the star coupler 66 via the optical coupler 16 and optical connector 61 to produce a code-division-multiplexed signal and then input to the optical processing section 102 of the optical line terminal 100 via the optical connector 68, optical fiber transmitting line 70, and optical connector 72. The code-division-multiplexed signal input to the optical processing section 102 is then input to the light-receiving element 126 via the optical coupler 124 that the optical processing section 102 comprises and converted into an electrical signal before being input to the electrical processing section 104 of the optical line terminal 100. A photodiode can be used as the light-receiving element 126.

The code-division-multiplexed signal that is input to the electrical processing section 104 is input to the auto gain control element 128 that the receiving signal processing section 108 comprises and is adjusted as an encoded receiving electrical signal that carries a fixed voltage value that has been set for the auto gain control element 128 irrespective of the intensity of the signal before being input to the decoding processing circuit that appears as 'decoding 1' of the decoding processing circuit array 132. The decoding processing circuit performs the same processing as the decoding processing circuit 30 that the optical network unit 10 comprises and the signal that has been transmitted from the ONU-1 of the first channel is generated and output.

Optical Access Network System of the First Invention

The optical access network system of the first invention is characterized in that the decoding processing circuit 30 comprises the analog matched filter 44 and decision circuit 46 and is particularly characterized by the constitution of the analog matched filter 44. The details will be provided subsequently but it is possible to achieve high-speed transmitting and receiving in the processing for decoding a code-division-multiplexed signal by means of the analog matched filter 44 and decision circuit 46.

The operation of the optical access system of the first invention will be described hereinbelow through division into encoding processing and decoding processing. Further, the structure and operation of the analog matched filter and decision circuit which are the features of the present invention will be described. Further, the structure and operation of the analog matched filter and decision circuit are also common in the case of an optical access system of the second invention (described subsequently).

Encoding Processing

The process of encoding a transmitting signal will be described by taking the first channel as an example with reference to FIGS. 2A1 to 2C. The horizontal and vertical axes have been omitted from FIGS. 2A1 to 2C but the direction of the horizontal axis indicates the direction of the time axis and the direction of the vertical axis indicates the intensity of the signal. FIGS. 2A1 and 2A2 show the transmitting signal and encoded transmitting signal respectively of the first channel and FIGS. 2B1 and 2B2 show the transmitting signal and encoded transmitting signal respectively of the second channel. Further, FIG. 2C shows a time waveform of the code-division-multiplexed signal obtained by multiplexing the encoded transmitting signal of the first channel and the encoded transmitting signal of the second channel. In FIGS. 2A1 to 2C, level 0 of the signal is indicated by a single dot-chain line. Levels above level 0 are shown as '1' and levels below level 0 are shown as '−1'.

A case where the transmitting signal of the first channel shown in FIG. 2A1 is (1, 0, 1, . . . ) is assumed and the time waveform is shown. FIG. 2A2 assumes code with a codelength of four that is given by (1, 0, 0, 1) and shows the time waveform of an encoded transmitting signal of the first channel that has been generated encoded by means of this code. Further, a case where the transmitting signal of the second channel shown in FIG. 2B1 is (1, 1, 0, . . . ) is assumed and the time waveform of this signal is shown. FIG. 2B2 assumes code with a codelength of four that is given as (1, 0, 1, 0) and shows a time waveform of the encoded transmitting signal of the second channel that is generated encoded by means of this code.

Here, the number of terms in the progression consisting of '0's and '1's that provide the code is also called the codelength. In this example, the progression providing the code is (1, 0, 0, 1) or (1, 0, 1, 0) and the number of terms of the progression is four and therefore the codelength is four. Further, the progression providing the code is called the code string and the terms '0' and '1' of the code string are also called chips. The 0s and 1s are also known as code values. The duration allocated to one bit of the transmitting signal (also called the time slot) is the reciprocal of the bit rate constituting the transmitting speed of the transmitting signal. The reciprocal of the duration allocated to one chip of the code is also called the chip rate.

When encoding is performed, the four chips constituting the code are allocated to the time slot allocated to one bit of the transmitting signal. That is, the chips are disposed on the time axis so that the encoded signal corresponding with the progression (1, 0, 0, 1) or (1, 0, 1, 0) providing the code is entirely contained in one bit of the transmitting signal on the time axis.

The significance of encoding the transmitting signal by means of code with a codelength of four corresponds to finding the product D×C of the transmitting signal (also expressed as 'D' hereinbelow) and the encoded signal (also expressed as 'C' hereinbelow). Furthermore, in the following description, when it is necessary to make the distinction of which channel signal D or C corresponds to, the number of channels is shown appended. For example, the fact that signals D and C are signals of the first channel is shown as $D_1$ and $C_1$. The same is also true of the second channel and so forth.

An EXNOR circuit, which is a gate circuit in which an inverter is connected to the output of an EXOR gate, is specifically used as the code assignment circuit for finding the product D×C. In this case, the transmitting signal and encoded transmitting signal and so forth which are represented as binary signals of '1's and '0's are converted to binary signals of '1's and '−1's. More specifically, the bias voltage of the transmitting signal and encoded transmitting signal may be adjusted to change the center of the amplitude of these signals to the level 0V.

The transmitting signal of the first channel shown in FIG. 2A1 is (1, 0, 1, . . . ) and, therefore, when the transmitting signal is converted into a binary signal of '1's and '−1's, the transmitting signal becomes (1, −1, 1, . . . ). The code that is used to encode the transmitting signal of the first channel is (1, 0, 0, 1) and, therefore, when converted into a binary signal of '1's and '−1's, the transmitting signal becomes (1, −1, −1, 1).

The first bit of the transmitting signal of the first channel is '1', the second bit is '0', and the third bit is '1'. Here, when the transmitting signal of the first channel is encoded by means of code given by (1, −1, −1, 1), this means that '1', which is the first bit, is encoded by means of code given by (1, −1, −1, 1), '−1', which is the second bit, is encoded by means of code given by (1, −1, −1, 1) and '1', which is the third bit, is encoded by means of code that is given by (1, −1, −1, 1). Although not illustrated, the encoding of the fourth and subsequent bits is also the same.

The encoding of the transmitting signal D by means of code C is equivalent to finding the product D×C and, therefore, '1', which is the first bit of the transmitting signal, is encoded as (first bit (1) of D)×C(1, −1, −1, 1)=(1×1, 1×(−1), 1×(−1), 1×1)=(1, −1, −1, 1). '−1', which is the second bit of the transmitting signal, is encoded as (second bit (−1) of D)×C(1, −1, −1, 1)=((−1)×1, (−1)×(−1), (−1)×(−1), (−1)×1)=(−1, 1, 1, −1). The same is also true of the third bit. Therefore, the encoded transmitting signal obtained by encoding the transmitting signal of the first channel shown in FIG. 2A1 is then ((1, −1, 1, −1, 1, −1, −1, 1, . . . ) as described earlier (FIG. 2A2).

Further, a case where the transmitting signal of the second channel shown in FIG. 2B1 is encoded as (1, −1, 1, −1), which is the result of converting the code (1, 0, 1, 0) into a binary code of '1's and '−1's is the same as the above case for the first channel. '1', which is the first bit of the transmitting signal, is encoded as (the first bit (1) of D)×C(1, −1, 1, −1)=(1×1, 1×(−1), 1×1, 1×(−1))=(1, −1, 1, −1). Because the second bit of the transmitting signal is also '1', the second bit of D is also encoded as (1, −1, 1, −1).

The third bit is '−1' and is therefore encoded as (the third bit (−1) of D)×C (1, −1, 1, −1)=((−1)×1, (−1)×(−1), (−1)×1, (−1)×(−1))=(−1, 1, −1, 1). Hence, the encoded transmitting signal obtained by encoding the transmitting signal of the second channel shown in FIG. 2B1 is then ((1, −1, 1, −1), (1, −1, 1, −1), (−1, 1, −1, 1))=(1, −1, 1, −1, 1, −1, 1, −1, −1, 1, −1, 1, . . . ) (FIG. 2B2) as mentioned earlier.

The code-division-multiplexed signal given by the sum of the encoded transmitting signal of the first channel (1, −1, −1, 1, −1, 1, 1, −1, 1, −1, −1, 1, . . . ) and the encoded transmitting signal of the second channel (1, −1, 1, −1, 1, −1, 1, −1, −1, 1, −1, 1, . . . ) is then (1+1, −1−1, −1+1, 1−1, −1+1, 1−1, 1+1, −1−1, 1−1, −1+1, −1−1, 1+1)=(2, −2, 0, 0, 0, 0, 2, −2, 0, 0, −2, 2) and FIG. 2C shows the time waveform of the code-division-multiplexed signal.

The code-division-multiplexed signal shown in FIG. 2C is converted to an optical signal and transmitted along the optical fiber transmitting line. When the code-division-multiplexed signal is received by the optical line terminal or optical network unit, the code-division-multiplexed signal is once again converted to an electrical signal and decoded to extract the receiving signal. Therefore, the absolute value of the amplitude of the time waveform of the code-division-multiplexed signal shown in FIG. 2C does not has a fundamental significance. Hence, the code-division-multiplexed signal shown in FIG. 2C has the same significance even when represented as (1, −1, 0, 0, 0, 0, 1, −1, 0, 0, −1, 1) by setting the middle of the maximum and minimum values of the amplitude as level 0 and normalizing the values of the amplitude to 1.

Decoding Processing

The process of decoding a code-division-multiplexed signal will now be described by taking the first channel as an example with reference to FIGS. 3A to 3D. In FIGS. 3A and 3B, the horizontal axis represents the direction of the time axis. The vertical axis is omitted but the direction of the vertical axis represents the intensity of the signal. FIG. 3A shows the time waveform of the code-division-multiplexed signal input to the analog matched filter that the decoding processing circuit comprises. The middle of the maximum and minimum values of the amplitude of the code-division-multiplexed signal shown in FIG. 2C above is set as level 0 and the values of the amplitude are shown normalized to 1. FIG. 3B shows a time waveform of a signal that has been decoded by the analog matched filter and output. The signal output from the analog matched filter is the sum of the auto-correlation waveform component constituting the receiving signal component of the optical network unit of the received channel and the cross-correlation waveform component received by optical network units other than the optical network unit of the received channel, as will be described subsequently. That is, the cross-correlation waveform component is the noise component.

FIG. 3C1 shows the time waveform of a signal that is output following a threshold value judgment by the decision circuit. FIG. 3C2 shows the time waveform of a clock signal for latching the signal shown in FIG. 3C1. Further, FIG. 3D shows the time waveform of a signal that is obtained by latching the signal output after undergoing the threshold value judgment shown in FIG. 3C1 by means of the clock signal shown in FIG. 3C2. The signal shown in FIG. 3D is the receiving signal. The horizontal and vertical axes of FIGS. 3C1, 3C2, and 3D are omitted. However, the direction of the horizontal axis represents the direction of the time axis and the direction of the vertical axis represents the intensity of the signal. Further, level 0 of the signal is indicated by a single dot-chain line.

The decision circuit for performing judgment processing on the signal output by the analog matched filter corresponds to the decision circuit 46 that the decoding processing circuit 30 shown in FIG. 1 comprises. Further, in FIG. 1, the decision circuit is shown as the decision circuit 46 which also includes a latch circuit for latching a signal that is output after undergoing the judgment processing shown in FIG. 3C1 by means of the clock signal shown in FIG. 3C2. The latch circuit, however, is not illustrated.

Encoding the transmitting signal means finding the product D×C of the transmitting signal D and the encoded signal C as mentioned earlier. Meanwhile, receiving the code-division-multiplexed signal that has been sent encoded and decoding the code-division-multiplexed signal corresponds to encoding the code-division-multiplexed signal once again by means of the same code. The code-division-multiplexed signal is the sum of all the multiplexed encoded transmitting signals such as the encoded transmitting signal of the first channel ($D_1 \times C_1$), the encoded transmitting signal ($D_2 \times C_2$) of the second channel, and the encoded transmitting signal ($D_3 \times C_3$) of the third channel. Hence, the code-division-multiplexed signal is expressed as $(D_1 \times C_1)+(D_2 \times C_2)+(D_3 \times C_3)+\ldots$. The decoding of the code-division-multiplexed signal by means of the code $C_1$ allocated to the first channel is equivalent to finding $\{(D_1 \times C_1)+(D_2 \times C_2)+(D_3 \times C_3)+\ldots\} \times C_1$ (encoding the code-division-multiplexed signal once again by means of the same code).

That is, the time waveform of the signal that is decoded by the analog matched filter and output is a signal that reflects $\{(D_1 \times C_1)+(D_2 \times C_2)+(D_3 \times C_3)+\ldots\} \times C_1 = (D \times C_1) \times C_1 + (D_2 \times C_2) \times C_1 + (D_3 \times C_3) \times C_1 + \ldots = D_1 \times C_1^2 + (D_2 \times C_2 \times C_1) + (D_3 \times C_3 \times C_1) + \ldots$. Here, $C_1^2 = 1$. This is because, since this is the product of the same code, the chips constituting both codes all have the same value, that is, '1' or '−1'. That is, this is because, when the computation of $C_1^2$ is viewed for each chip of the code, $1 \times 1 = 1$ or $(-1) \times (-1) = 1$ must be '1'. Hence, the first term $D_1 \times C_1^2$, which represents the time waveform of the signal output after being decoded by the analog matched filter is $D_1$ and the pulse $D_1$ of each bit constituting the transmitting signal of the first channel is regenerated. That is, this component corresponds to the auto-correlation waveform component with respect to the transmitting signal of the first channel of the signal that has been decoded and output by the analog matched filter.

On the other hand, the second and subsequent terms representing the time waveform of the signal that has been decoded and output by the analog matched filter above is $C_1 \times C_i \neq 1$ (here, i=2, 3, . . . ) and, therefore, the pulses $D_2$ and $D_3$ of the respective bits constituting the transmitting signals of the second and third channels are not regenerated from the terms $(D_2 \times C_2) \times C_1$ and $(D_3 \times C_3) \times C_1$. That is, these components correspond to the cross-correlation waveform component with respect to the transmitting signal of the first channel of the signal that has been decoded and output by the analog matched filter.

As described earlier, the analog matched filter is capable of regenerating the auto-correlation waveform component by decoding the code-division-multiplexed signal. In FIG. 3B, the pulse component shown on the time axis (indicated by P and Q in FIG. 3B) is the auto-correlation waveform component. Further, the cross-correlation waveform component is the noise component contained between the broken lines that appear above and below the time axis that is interposed therebetween. In FIG. 3B, the cross-correlation waveform component has a very complicated shape and, therefore, the levels of the maximum and minimum values are denoted by the broken lines shown above and below the time axis that is interposed therebetween, the detailed shape of the cross-correlation waveform component being omitted here.

A signal that is output as a result of using the decision circuit to process the time waveform of the signal that is decoded and output by the analog matched filter shown in FIG. 3B such that only the auto-correlation waveform component is extracted is shown in FIG. 3C1. The signal shown in FIG. 3C1 is latched by the clock signal shown in FIG. 3C2, whereby the receiving signal shown in FIG. 3D is obtained.

The details of the latch processing by the decision circuit will be described next with reference to FIGS. 3C1, 3C2, and 3D. Because a well-known D flip flop circuit or the like can be used as the latch circuit for performing latch processing, the description of the latch circuit is omitted here. In this embodiment, an MC100LVEL31 (manufactured by ON semiconductors) is used as the D flip flop circuit.

The time waveform shown in FIG. 3C1 is generated by processing the signal that is decoded and output by the analog matched filter shown in FIG. 3B by the threshold value processing circuit as will be described subsequently. That is, the threshold value processing circuit fulfils the role of converting the analog decoded signal shown in FIG. 3B into the digital decoded signal shown in FIG. 3C1. Hence, the time waveform shown in FIG. 3C1 is characterized in that a rectangular wave (rectangular pulse) appears in correspondence with the auto-correlation waveform component of the decoded and output signal shown in FIG. 3B. The size of the amplitude of the rectangular pulse is specified by the threshold value processing circuit and the size of the amplitude of all the rectangular pulses appearing in FIG. 3C1 is constant. An example of a rectangular pulse in FIG. 3C1 is shown sandwiched by two down-facing arrows labeled a and b. A comparator can be suitably selected from well-known comparators and used as the threshold value processing circuit. In this embodiment, a MAX9600 (manufactured by MAXIM Integrated products) was used.

When the digital decoded signal shown in FIG. 3C1 and the clock signal shown in FIG. 3C2 are input to the D flip flop circuit that functions as a latch circuit, the following processing is performed and the receiving signal shown in FIG. 3D is obtained.

When a rectangular pulse that corresponds to the peak of the auto-correlation waveform of the digital decoded signal (shown sandwiched by two down-facing arrows labeled a and b in FIG. 3C1, for example) exists at the moment when the clock signal shown in FIG. 3C2 rises (the moment shown as X in FIG. 3C2, for example), the output of a signal for the intensity corresponding to '1' from the output terminal of the D flip flop circuit begins. The output of the signal for the intensity corresponding to '1' continues from the output terminal of the D flip flop circuit until the moment the clock signal rises once again (moment shown as Y in FIG. 3C2) and changes at that moment to a signal for the intensity that corresponds to '−1' from the output terminal of the D flip flop circuit.

Likewise, the subsequent start of the output of the signal for the intensity that corresponds to '1' from the output terminal of the D flip flop circuit is the moment of the rise of the clock signal shown as 'Z' in FIG. 3C2. Further, the change in the output signal form the output terminal of the D flip flop circuit to a signal for the intensity that corresponds to '−1' is the moment when the clock signal rises once again (this moment takes place beyond FIG. 3C2).

As described earlier, when the rising signal of the clock signal is input to the D flip flop circuit within the time the rectangular pulse corresponding with the peak of the auto-correlation waveform of the digital decoded signal exists, the rectangular pulse of the intensity corresponding to '1' of the receiving signal shown in FIG. 3D is generated. Meanwhile, when the rising signal of the clock signal is input to the D flip flop circuit at a time other than the time the rectangular pulse corresponding with the peak of the auto-correlation waveform of the digital decoded signal exists, a signal corresponding to '−1' is output as is from the output terminal of the D flip flop circuit.

Thus, a signal that corresponds to '1' or a signal that corresponds to '−1' is output from the output terminal of the D flip flop circuit depending on whether a rectangular pulse corresponding with the peak of the auto-correlation waveform of the digital decoded signal exists at the moment the clock signal rises. The receiving signal is thus regenerated. The receiving signal shown in FIG. 3D results from the regeneration of a part (1, −1, 1, . . . ) which is a portion of the transmitting signal (1, −1, 1, . . . ) shown in FIG. 2A1. In order to render the part corresponding to (1, −1, 1, . . . ) explicit in FIG. 3D, '1' and '−1', which are the values of the signal, are shown in brackets.

As can be seen from the above description, if a rectangular pulse that corresponds with the peak of the auto-correlation waveform of the digital decoded signal does not exist at the moment the clock signal rises, the receiving signal shown in FIG. 3D cannot be generated. Therefore, the relative positional relationship on the time axis between the digital decoded signal shown in FIG. 3C1 and the clock signal shown in FIG. 3C2 must be adjusted. The adjustment of the relative positional relationship of the digital decoded signal and clock signal will now be described with reference to FIG. 1.

The code-division-multiplexed signal output from the light-receiving element 18 is split by the electrical signal splitter 26, whereupon one of the resulting signals is input to the clock signal regeneration circuit 34 such that the clock signal of the transmitting rate frequency is regenerated and output. The clock signal of the transmitting rate frequency is split by an electrical signal splitter 36, whereupon one of the resulting signals is input to the frequency divider 38 and converted and output to the clock signal of the base rate frequency. Here, the transmitting rate frequency denotes the frequency that corresponds with the bit rate of the code-division-multiplexed signal and the base rate frequency denotes the frequency that corresponds with the bit rates of the transmitting signals of the individual channels. That is, the frequency obtained by dividing the transmitting rate frequency by the number of channels is the base rate frequency.

The clock signal output by the frequency divider 38 is input to a second delay circuit 40 and then output following adjustment of the phase. The clock signal output from the second delay circuit 40 is shown in FIG. 3C2. That is, the position on the time axis of the clock signal shown in FIG. 3C2 can be adjusted by the second delay circuit 40. The adjustment may be performed manually but can also be performed automatically. One means for making the adjustment automatic is disclosed in Japanese Unexamined Patent Application No. 2005-33544.

Here, the noise component contained in the time waveform of the signal decoded and output by the analog matched filter shown in FIG. 3B will be described. In the optical network unit 10 of the optical access network system shown in FIG. 1, a transmitting signal is output from the transmitting signal processing section 24, while a receiving signal is input to the receiving signal processing section 22. Here, code for encoding and code for decoding are allocated to the respective channels. The same code is then used. There is therefore the problem that the reflection noise produced in the optical connector or the like for the connection with the optical (de) multiplexer provided in the optical transmitting line is mixed with the receiving signal that is input to the receiving signal processing section.

Figure 4:
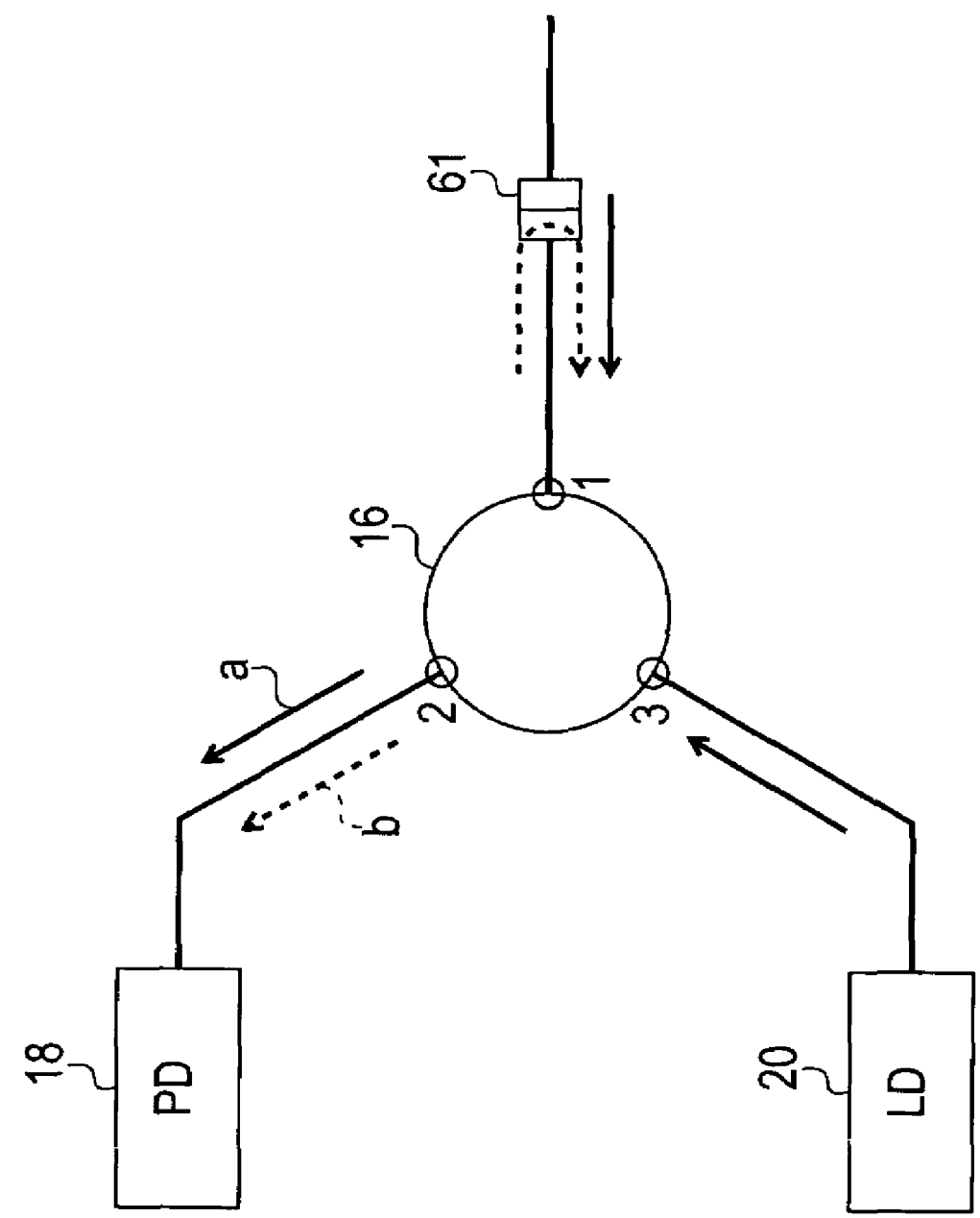
FIG. 4 serves to describe an aspect in which reflected light from an optical connector is incorporated in a receiving signal processing section.

The mechanism of the mixing of the reflection noise with the receiving signal will now be described with reference to FIG. 4. FIG. 4 serves to describe an aspect in which reflected light from an optical connector is incorporated in a receiving signal processing section. In FIG. 4, only the parts required for the description of the mechanism of the mixing of reflection noise into the receiving signal have been taken from FIG. 1 and shown. The transmitting signal is output from the light-emitting element 20 and input via port 3 of the optical coupler 16 before being output from port 1 to the optical connector 61. A portion of the transmitting signal is then reflected by the optical connector 61 and input to port 1 of the optical coupler 16. The reflected transmitting signal is output from port 2 of the optical coupler 16 before being input to the light-receiving element 18.

Hence, both a receiving signal a that is input via port 1 of the optical coupler 16 and output from port 2 and a portion b of the transmitting signal reflected by the optical connector 61 are input to the light-receiving element 18. Portion b of the transmitting signal is mainly input via port 3 of the optical coupler 16 and the transmitting signal output from port 1 is reflected by the optical connector 61, input to port 1 once again, and then output from port 2.

A case where a receiving signal and a signal resulting from the mixing of the reflected transmitting signal are decoded in the optical access network system of the first invention will now be described with reference to FIGS. 5A and 5B. FIGS. 5A and 5B show the relationship between the receiving signal and the peak position of the auto-correlation waveform when the signal resulting from the mixing of the reflected transmitting signal is decoded. The horizontal axis of FIGS. 5A and 5B represents the time axis and the vertical axis is omitted but the signal intensity is shown in the direction of the vertical axis.

Because the transmitting signal and receiving signal are signals that have been encoded by means of the same code, there are cases where the peak positions of the two auto-correlation waveforms match. In FIGS. 5A and 5B, the peak denoted by c shows the auto-correlation waveform of the receiving signal and the peak denoted by r shows the auto-correlation waveform of the reflected transmitting signal. FIG. 5A represents a case where the peak positions of the auto-correlation waveforms of the receiving signal and the reflected transmitting signal match and FIG. 5B represents a case where the peak positions of the auto-correlation waveforms of the receiving signal and the reflected transmitting signal do not match.

In FIGS. 5A and 5B, the cross-correlation waveform component of the receiving signal is a noise component contained between the bold broken lines shown above and below the time axis that is sandwiched therebetween and the cross-correlation waveform component of the transmitting signal is a noise component contained between the narrow broken lines shown above and below the time axis that is sandwiched therebetween. The cross-correlation waveform component has a very complex shape and, therefore, the levels of the maximum and minimum values are denoted by the broken lines shown above and below the time axis that is interposed therebetween, the detailed shape of the cross-correlation waveform component being omitted here.

When the receiving signal shown in FIG. 5A and the peak position of the auto-correlation waveform of the reflected transmitting signal match, the difference between the peak of the auto-correlation waveform of the receiving signal and the peak of the auto-correlation waveform of the transmitting signal is the net signal component, which is denoted by $S_1$ in FIG. 5A. The value of N that gives the S/N ratio in this case is the peak intensity of the auto-correlation waveform of the transmitting signal and is denoted by $N_1$ in FIG. 5A.

On the other hand, when the peak positions of the two auto-correlation waveforms shown in FIG. 5B do not match, the difference between the peak of the auto-correlation waveform and the peak of the cross-correlation waveform of the receiving signal is the net signal component and is denoted by S2 in FIG. 5B. The value of N that gives the S/N ratio in this case is the peak intensity of the cross-correlation waveform component of the receiving signal and is denoted by N2 in FIG. 5B.

As shown in FIGS. 5A and 5B, $S_1 < S_2$ and $N_1 > N_2$. Hence, the S/N ratio $S_2/N_2$ when the peak positions of the two auto-correlation waveforms shown in FIG. 5B do not match is larger than the S/N ratio $S_1/N_1$ when the peak positions of the two auto-correlation waveforms shown in FIG. 5A match. That is, $(S_2/N_2) > (S_1/N_1)$. Hence, because the S/N ratio can be increased by receiving the peak position of the auto-correlation waveform of the receiving signal and the peak position of the auto-correlation waveform of the reflected transmitting signal displaced with respect to each other, it can be said that the two peak positions are preferably received displaced in this manner.

The adjustment of the peak positions of the auto-correlation waveforms of the receiving signal and reflected transmitting signal can be implemented by adjusting the delay amount of a first delay circuit 58 shown in FIG. 1. When the case of the first channel is described as an example, the encoded transmitting signal output from a code assignment circuit 56 is input to the first delay circuit 58 to adjust the phase of the encoded transmitting signal. Because the delay amount of the encoded transmitting signal is adjusted by the first delay circuit 58, the positional relationship on the time axis between the peak position of the auto-correlation waveform of the transmitting signal that is reflected by the optical connector 61 and the peak position of the auto-correlation waveform of the encoded transmitting signal output from the first delay circuit 58 can be adjusted. The interval between the peak positions of the two auto-correlation waveforms changes in correspondence with the delay amount provided by the first delay circuit 58. That is, as shown in FIG. 5B, a state where the peak positions of the two auto-correlation waveforms do not match can be established. The interval between the peak positions of the auto-correlation waveforms of the receiving signal and the reflected transmitting signal, which corresponds with the delay amount provided by the first delay circuit 58, is shown in FIG. 5B by a line segment that runs parallel to the time axis and which has an arrow at both ends thereof.

Analog Matched Filter

One characteristic of the optical access network system of the present invention lies in the fact that a code-division-multiplexed signal is decoded by an analog matched filter. Therefore, the constitution and operation of the analog matched filter will now be described with reference to FIGS. 6A and 6B.

FIGS. 6A and 6B are schematic block constitutional views of the analog matched filter. The analog matched filter comprises an analog shift register 140, a positive signal adder 142, a negative signal adder 144, an analog adder 146 for adding the output signals that are output by the positive signal adder 142 and negative signal adder 144 respectively, and a lowpass filter 148. The positive signal adder 142 and negative signal adder 144 each comprise an amplifier 150 and an inverting amplifier 152. The amplifier 150 and inverting amplifier 152 are shown with their peripheral circuits omitted.

A code-division-multiplexed signal that is output from the auto gain control element 28 is input to the input terminal shown as a data input. Further, a clock signal of a transmitting rate frequency that is split by the electrical signal splitter 36 is input to the input terminal shown as the clock input.

The analog matched filter shown in FIG. 6A is designed by assuming that decoding is performed by means of the code provided by the progression (1, 0, 0, 1). That is, it is assumed that decoding is performed by means of the code allocated to the first channel of Embodiment A. The code provided by the progression (1, 0, 0, 1) may be code that is provided by the progression (1, −1, −1, 1) when a binary display of '1's and '−1's is provided.

Here, for the purpose of simplification, only the component of the first channel is first taken from the code-division-multiplexed signal and described. Although encoded transmitting signals of channels other than the first channel are also mixed with the code-division-multiplexed signal, because the code allocated to the first channel is encoded by means of different code, these other encode transmitting signals are not regenerated.

The regeneration of the encoded transmitting signal of the first channel shown in FIG. 2A2 as a receiving signal of the same time waveform as the transmitting signal of the first channel with the time waveform shown in FIG. 2A1 by the analog matched filter will now be described.

A shift register that is formed by a four-stage (shown as 1, 2, 3, 4 in order from the input side) charge coupled device (CCD) (called a 'CCD shift register' hereinbelow) is employed as the analog shift register 140. That is, the analog shift register 140 is a four-bit CCD shift register. In Embodiment A, because a case where encoding is performed by means of code with a chip number of four (code with a codelength of four) is assumed, a four-stage CCD shift register is used. In reality, because code with a long codelength such as code with a chip number of 16 or 32 is used, a CCD shift register with a large number of stages such as a 16- or 32-stage CCD shift register is employed. However, the principles described below are the same.

When sixteen channels for which the bit rate of the respective channels is 125 Mbit/s are encoded by means of orthogonal code with a codelength of 16 and multiplexed or when thirty-two channels L or which the bit rate of the respective channels is 62.5 Mbit/s are encoded by means of orthogonal code with a codelength of 32 and multiplexed, the chip rate of the encoding is 2 Gbit/s. That is, the charge between the respective stages of the CCD shift register may be shifted at 2 Gb/s. On the other hand, in current CCD shift registers, the speed of the shift of the charge between the respective stages is secured at about 10 Gbit/s. Hence, with an analog matched filter that uses a CCD shift register, encoding with a chip rate of 2 Gbit/s can be implemented easily. That is, in the case of a PON, an optical access network system that allows a service provider and subscribers to communicate at 100 Mbit/s by using a code-division-multiplexing system can be implemented easily.

A clock signal of the transmitting rate frequency is input to the clock input terminal of the CCD shift register 140. Further, a code division multiplexed signal (encoded transmitting signal shown in FIG. 2A2) is input to the data input terminal of the CCD shift register 140. The input and output terminals of the first stage of the CCD shift register 140 shown in FIGS. 6A and 6B are shown as $D_1$ and $Q_1$ respectively. Further, the input terminals of the second, third, and fourth stages are shown as $D_2$, $D_3$, and $D_4$ respectively and the output terminals thereof are shown as $Q_2$, $Q_3$, and $Q_4$ respectively. The data input terminal of the CCD shift register 140 is connected to the input terminal $D_1$ of the first stage.

The principles according to which the code-division-multiplexed signal of the first channel that has been encoded by the code $(1, -1, -1, 1)$ will now be described with reference to FIG. 6A.

First, when a code-division-multiplexed signal, that is, here, '1' of the encoded transmitting signal of the first channel shown in FIG. 2A (the time slot shown as CS1 in FIG. 2A2 is 1) is input to the data input terminal $D_1$ of the first stage of the CCD shift register, '1' is output from the output terminal $Q_1$ of the first stage in sync with the clock signal. Thereafter, when '−1' (the time slot shown as CS2 of FIG. 2A2 is −1) of the encoded transmitting signal of the first channel is input to the data input terminal D1 of the first stage, '−1' is output from the output terminal $Q_1$ of the first stage and '1' is output from the output terminal $Q_2$ of the second stage in sync with the clock signal. Thus, when signals of the time slot shown as CS3 and the time slot shown as CS4 are input successively to the data input terminal D1 of the first stage, the signals output first are output shifted with respect to one another one stage at a time from the output terminals of the first to fourth stages in sync with the clock signal.

Right at the stage where all the chips of the encoded transmitting signal that exist in the time slots CS1 to CS4 are input from the data input terminal of the analog shift register 140, the output values ($Q_1$, $Q_2$, $Q_3$, and $Q_4$) from the respective output terminals of the first to fourth stages, that is, the output terminals $Q_1$, $Q_2$, $Q_3$, and $Q_4$ are $(1, -1, -1, 1)$. That is, ($Q_1$, $Q_2$, $Q_3$, and $Q_4$), which are the respective output values of the first to fourth stages, appear as the voltage values in the positions shown as F, G, H, and I in the analog shift register 140.

The voltage value of position F and the voltage value of position I are input to the positive signal adder 142, multiplexed by the electrical signal multiplexer 154, input to the amplifier 150, and then output as a signal that corresponds to the sum of the voltage value of position F and the voltage value of position I. Meanwhile, the voltage value of position G and the voltage value of position H are input to the negative signal adder 144, multiplexed by an electrical signal multiplexer 156, input to the inverting amplifier 152, and the voltage value (negative value) corresponding to the sum of the voltage value of position G and the voltage value of position H is converted into a positive voltage value and then output.

The output signal from the amplifier 150 and the output signal from the inverting amplifier 152 are multiplexed by the analog adder 146 before being input to the lowpass filter 148.

The lowpass filter 148 fulfils the role of blocking the high-frequency noise component by filtering base rate frequency signals among the signals output from the analog adder 146.

Right at the stage where all the chips of the encoded transmitting signal that exist in the time slots CS1 to CS4 are input from the data input terminal of the analog shift register 140, the output values ($Q_1$, $Q_2$, $Q_3$, and $Q_4$) from the output terminals $Q_1$, $Q_2$, $Q_3$, and $Q_4$ are $(1, -1, -1, 1)$ and, therefore, the potentials 1 and 1 which are the potentials in positions F and I are input by the electrical signal multiplexer 154, whereby a potential 2 is produced which is input to the amplifier 150. Further, potential −1 and potential −1, which are the potentials in positions G and H, are input to the electrical signal multiplexer 156, whereby a potential −2 is produced which is input to the 152.

Therefore, a signal with a potential that is proportional to a potential 2 (here, the gain for the sake of simplification is 1) is output by the amplifier 150 and a signal of potential 2 obtained by inverting a potential −2 (here, the gain is −1 for the sake of simplification) is output by the inverting amplifier 152 and the two signals are multiplexed by the analog adder 146 and output from the data output terminal of the CCD shift register 140 via the lowpass filter 148 as a signal of potential 4.

The output values of CCD shift register 140 ($Q_1$, $Q_2$, $Q_3$, and $Q_4$) are subsequently $(1, -1, -1, 1)$ at the stage where the chips that exist in the time slots CS9 to CS12 are all input from the data input terminal of the analog shift register 140. A signal of potential 4 is then likewise output from the data output terminals of the CCD shift register 140.

When the output values ($Q_1$, $Q_2$, $Q_3$, and $Q_4$) of the CCD shift register 140 produce an output that is different from $(1, -1, -1, 1)$, a signal equal to or more than potential 4 is not output by the data output terminal of the CCD shift register 140 and must be less than potential 4. This is evident upon investigating, as per the earlier description, a case where the output values ($Q_1$, $Q_2$, $Q_3$, and $Q_4$) of the CCD shift register 140 differ from $(1, -1, -1, 1)$ as per a state such as $(1, -1, 1, 1)$, for example. The principles according to which the code-division-multiplexed signal of the second channel encoded by means of the code $(1, -1, 1, -1)$ is decoded will be described next with reference to FIG. 6B. The difference between the analog matched filter shown in FIG. 6A and the analog matched filter shown in FIG. 6B consists of the difference in taking the signal input to the amplifier 150 and inverting amplifier 152 from any of the positions F, G, H, and I. In the case of the analog matched filter shown in FIG. 6A, the input signal to the amplifier 150 is taken from positions F and I and the input signal to the inverting amplifier 152 is taken from positions G and H. On the other hand, in the case of the analog matched filter shown in FIG. 6B, the input signal to the amplifier 150 is taken from the positions G and I, and the input signal to the inverting amplifier 152 is taken from positions F and H. Thus, an optional code with a codelength of four can be set by taking the signal input to the amplifier 150 and inverting amplifier 152 from any of the positions, F, G, H, and I.

Although encoded transmitting signals of channels other than the second channel are also mixed with the code-division-multiplexed signal, these signals are encoded using different code from the code allocated to the second channel and are therefore not regenerated.

The regeneration of the encoded transmitting signal of the second channel shown in FIG. 2B2 as a receiving signal of the same time waveform as the transmitting signal of the second channel with the time waveform shown in FIG. 2B1 by the analog matched filter will now be described. The decoding operation of the analog matched filter shown in FIG. 6B is basically the same as that of the analog matched filter shown in FIG. 6A.

First, when a code-division-multiplexed signal, that is, here, '1' of the encoded transmitting signal of the second channel shown in FIG. 4B2 (the time slot shown as CS1 in FIG. 2B2 is 1) is input to the data input terminal $D_1$ of the first stage of the CCD shift register, '1' is output from the output terminal $Q_1$ of the first stage in sync with the clock signal. Thereafter, when '−1' (the time slot shown as CS2 of FIG. 2B2 is −1) of the encoded transmitting signal of the second channel is input to the data input terminal $D_1$ of the first stage, '−1' is output from the output terminal $Q_1$ of the first stage and '1' is output from the output terminal $Q_2$ of the second stage in sync with the clock signal. Thus, when signals of the time slot shown as CS3 and the time slot shown as CS4 are input successively to the data input terminal $D_1$ of the first stage, the signals output first are output shifted with respect to one another one stage at a time from the output terminals of the first to fourth stages in sync with the clock signal.

Right at the stage where all the chips of the encoded transmitting signal that exist in the time slots CS1 to CS4 are input from the data input terminal of the analog shift register 140, the output values ($Q_1$, $Q_2$, $Q_3$, and $Q_4$) from the respective output terminals of the first to fourth stages, that is, the output terminals $Q_1$, $Q_2$, $Q_3$, and $Q_4$ are (−1, 1, −1, 1). That is, ($Q_1$, $Q_2$, $Q_3$, and $Q_4$), which are the respective output values of the first to fourth stages, appear as the voltage values in the positions shown as F, G, H, and I in the analog shift register 140.

The voltage value of position G and the voltage value of position I are input to the positive signal adder 142, multiplexed by the electrical signal multiplexer 154, input to the amplifier 150, and then output as a signal that corresponds to the sum of the voltage value of position G and the voltage value of position I. Meanwhile, the voltage value of position F and the voltage value of position H are input to the negative signal adder 144, multiplexed by the electrical signal multiplexer 156, input to the inverting amplifier 152, and the voltage value (negative value) corresponding to the sum of the voltage value of position F and the voltage value of position H is converted into a positive voltage value and then output.

The output signal from the amplifier 150 and the output signal from the inverting amplifier 152 are multiplexed by the analog adder 146 before being input to the lowpass filter 148.

Right at the stage where all the chips of the encoded transmitting signal that exist in the time slots CS1 to CS4 are input from the data input terminal of the analog shift register 140, the output values ($Q_1$, $Q_2$, $Q_3$, and $Q_4$) from the output terminals $Q_1$, $Q_2$, $Q_3$, and $Q_4$ are (−1, 1, −1, 1) and, therefore, the potentials 1 and 1 which are the potentials in positions G and I are input by the electrical signal multiplexer 154, whereby a potential 2 is produced which is input to the amplifier 150. Further, potential −1 and potential −1, which are the potentials in positions F and H, are input to the electrical signal multiplexer 156, whereby a potential −2 is produced which is input to the 152.

Therefore, a signal with a potential that is proportional to a potential 2 is output by the amplifier 150 and a signal of potential 2 obtained by inverting a potential −2 is output by the inverting amplifier 152 and the two signals are multiplexed by the analog adder 146 and output from the data output terminal of the CCD shift register 140 via the lowpass filter 148 as a signal of potential 4.

The output values of CCD shift register 140 ($Q_1$, $Q_2$, $Q_3$, and $Q_4$) are subsequently (−1, 1, −1, 1) at the stage where the chips that exist in the time slots CS5 to CS8 are all input from the data input terminal of the analog shift register 140. A signal of potential 4 is then likewise output from the data output terminals of the CCD shift register 140.

When the output values ($Q_1$, $Q_2$, $Q_3$, and $Q_4$) of the CCD shift register 140 produce an output that is different from (−1, 1, −1, 1), a signal equal to or more than potential 4 is not output by the data output terminal of the CCD shift register 140 and must be less than potential 4.

As mentioned earlier, a signal of potential 4 is output from the data output terminal of the CCD shift register 140 only when the output values ($Q_1$, $Q_2$, $Q_3$, and $Q_4$) of the CCD shift register 140 match the code that has been set. This is a signal that corresponds to an auto-correlation waveform. For example, in the case of a time waveform of a signal that is obtained by decoding the encoded transmitting signal of the first channel shown in FIG. 3B, the peaks shown as P and Q are peaks that appear at the moments when a signal of potential 4 is output from the data output terminal of the CCD shift register 140.

Decision Circuit

Figure 7A:
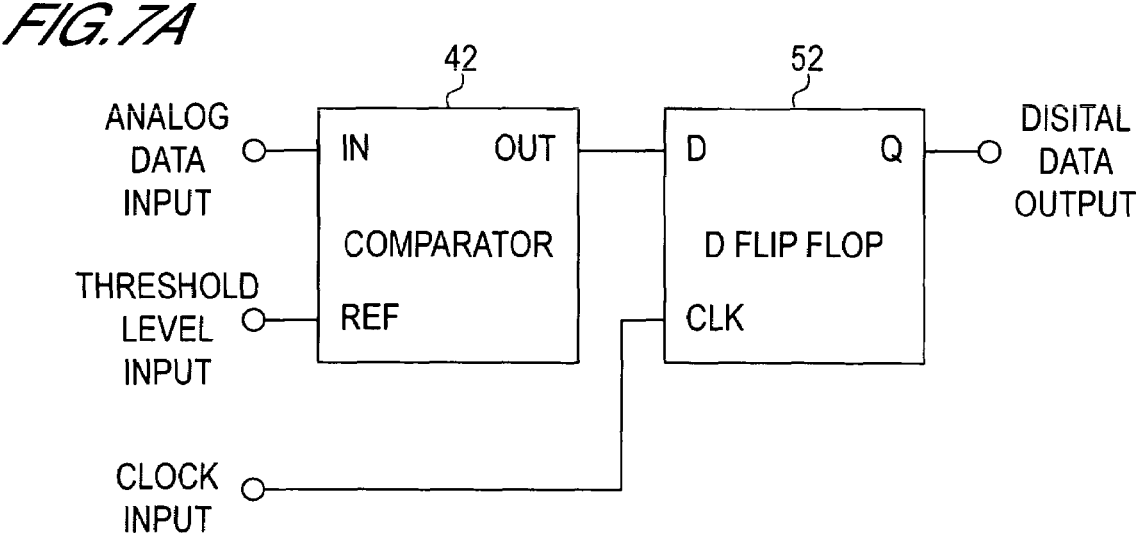
FIG. 7 is a schematic block constitutional view of a decision circuit which serves to describe the operating principles of the decision circuit.
Figure 7B:
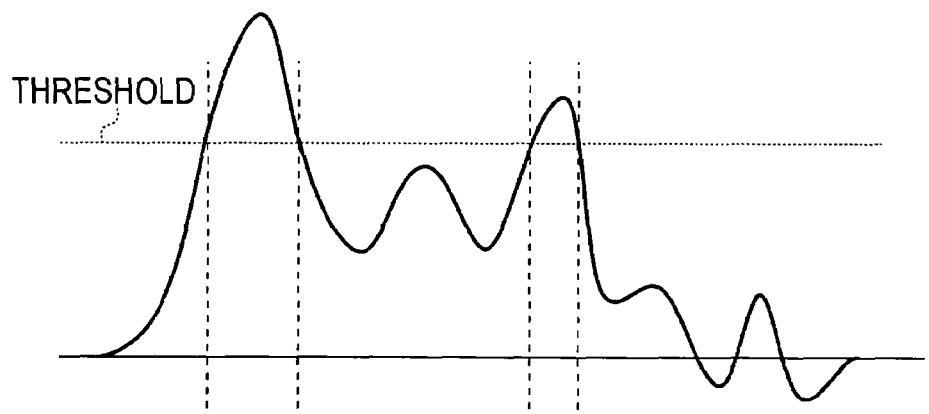
Figure 7C:
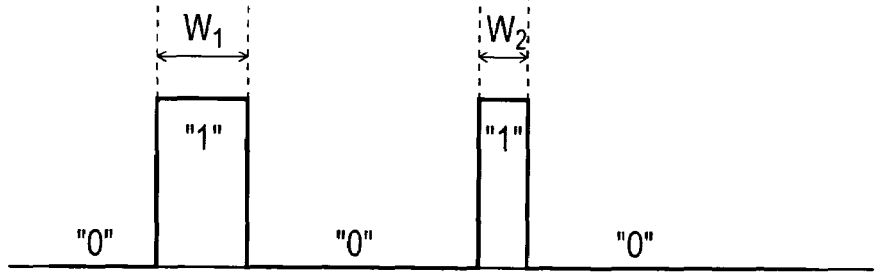

The constitution and operation of the decision circuit will now be described with reference to FIGS. 7A to 7C. FIG. 7A is a schematic block constitutional view of the decision circuit and FIG. 7B shows a time waveform of a decoded signal that is output from the analog matched filter. Further, FIG. 7C shows a time waveform of a signal that is output after being subjected to threshold value judgment. The horizontal axis of FIGS. 7B and 7C represents the time axis and the vertical axis is omitted but the direction of the vertical axis represents the signal intensity.

The time waveform shown in FIG. 7B corresponds to a time waveform of a signal that has been encoded and output by the analog matched filter which is shown in FIG. 3B. FIGS. 7B and 3B appear different but these drawings are shown as abstractions for the sake of the expediency of the description and the time waveform of the real signal is close to that of FIG. 7B.

The decision circuit is constituted comprising a comparator 42 and D flip flop circuit 52. The decoded signal that has been output by the analog matched filter shown in FIG. 7B is input to the input terminal (IN) of the comparator 42 from the analog data input terminal of the decision circuit. Meanwhile, a signal of the potential set as the threshold value is input from the threshold value level input terminal (REF). This potential corresponds to the potential that appears as the threshold value in FIG. 7B.

A signal of a potential corresponding to 1 is output from the output terminal (OUT) of the comparator 42 when the level of the signal input from the input terminal (IN) exceeds the threshold value. On the other hand, when the level of the signal input from the input terminal (IN) falls below the threshold value, a signal of a potential corresponding to 0 is output. Hence, the time waveform of the signal output from the output terminal (OUT) of the comparator 42 is the time waveform shown in FIG. 7C. The time waveform shown in FIG. 7C corresponds with the time waveform shown in FIG. 3C1 above.

The signal of the time waveform shown in FIG. 7C is input to the input terminal (D) of the D flip flop circuit 52. Meanwhile, the clock signal is input to the clock signal input terminal (CLK) of the D flip flop circuit 52. The clock signal input to the clock signal input terminal (CLK) is the clock signal shown in FIG. 3C2. That is, the signal that is output after being subjected to a threshold value judgment which is input to the input terminal (D) is latched by the clock signal. Since the principles of the latching operation have already been described, they will not be repeated here.

Although the widths of the rectangular pulses are shown equal in FIG. 3C1, in reality, the widths of the rectangular pulses are not equal as per the time waveform shown in FIG.

7C. However, because the moment the clock signal rises may be contained in the range of the widths of the rectangular pulses, the widths of the rectangular pulses need not necessarily be equal. However, the position of the clock signal on the time axis must be adjusted by the second delay circuit so that the moment the clock signal input to the clock signal input terminal (CLK) rises is contained in the widths (W1 and W2) of the rectangular pulses shown in FIG. 7C.

Optical Access Network System of the Second Invention

Embodiment A

Figure 8:
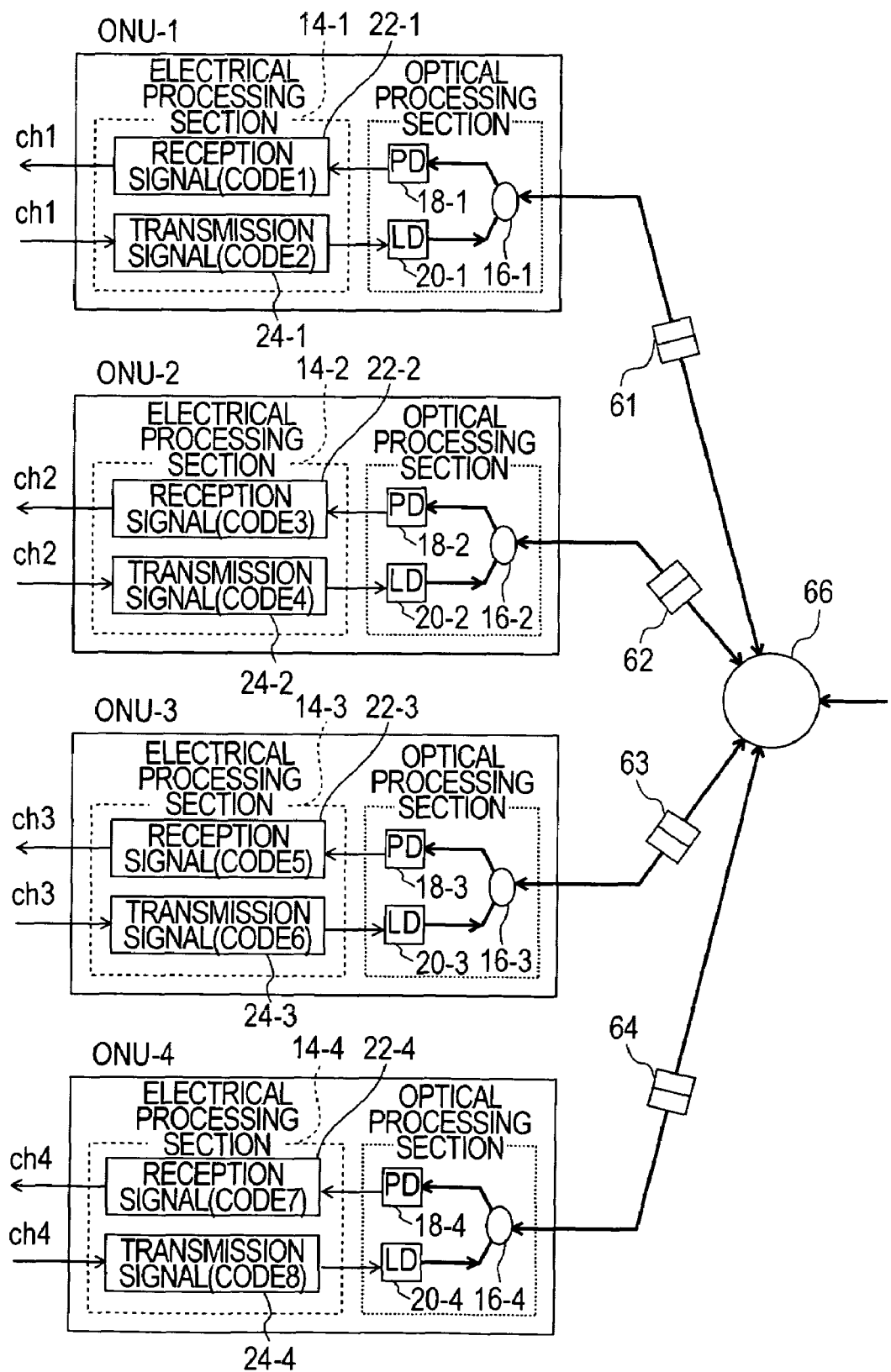
FIG. 8 is a schematic block constitutional view of an optical network unit of an embodiment A of the optical access network system of a second invention.

The optical access network system of the second invention is characterized in that code is selected so that the codes set for the transmitting signal processing section that the ONU comprises and the code that is set for the transmitting signal processing section that the OLT comprises differ from channel to channel. The constitution of the ONU in this case will now be described as Embodiment A with reference to FIG. 8. FIG. 8 is a schematic block constitutional view of the ONU of Embodiment A of the optical access network system of the second invention. FIG. 8 shows a view obtained by taking the constitution of the parts of the ONU of the optical access network system shown in FIG. 1, which is shown simplified to the extent required for the subsequent description.

The electrical processing section 14 shown in FIG. 1 corresponds to the electrical processing sections 14-1 to 14-4 shown in FIG. 8, the optical coupler 16 corresponds to the optical couplers 16-1 to 16-4 shown in FIG. 8, the light-receiving element 18 corresponds to the light-receiving elements 18-1 to 18-4 shown in FIG. 8, the light-emitting element 20 corresponds to the light-emitting elements 20-1 to 20-4 shown in FIG. 8, the receiving signal processing section 22 corresponds to the receiving signal processing sections 22-1 to 22-4 shown in FIG. 8, and the transmitting signal processing section 24 corresponds to the transmitting signal processing sections 24-1 to 24-4 shown in FIG. 8. ONU-1 to ONU-4 are connected to the star coupler 66 via the optical connectors 61, 62, 63, and 64 respectively. The electrical processing sections of ONU-1 to ONU-4 comprise a receiving signal processing section and a transmitting signal processing section. Further, code 1 is set for the receiving signal processing section 22-1 of ONU-1 and code 2 is set for the transmitting signal processing section 24-1. Likewise, code 3 is set for the receiving signal processing section 22-2 of ONU-2 and code 4 is set for the transmitting signal processing section 24-2. Code 5 is set for the receiving signal processing section 22-3 of the ONU-3 and code 6 is set for the transmitting signal processing section 24-3. Code 7 is set for the receiving signal processing section 22-4 of ONU-4 and code 8 is set for the transmitting signal processing section 24-4.

Meanwhile, as described earlier with reference to FIG. 1, the OLT 100 also comprises the encoding processing circuit array 116 that comprises parallel encoding processing sections to which the same code as the code allocated to the respective transmitting signal processing sections ONU-1 to ONU-4 is allocated, a decoding processing circuit array 132 that comprises parallel decoding processing circuits to which the same code as the code allocated to each of the receiving signal processing sections ONU-1 to ONU-4 is allocated, and the auto gain control element 128.

The flow of the processing of uplink and downlink signals will now be described for ONU-1 to which the first channel is allocated. First, the downlink signal will be described. The downlink signal of the first channel from the OLT to ONU-1 is an encoded transmitting signal that is encoded by means of code 1 and is transmitted from the OLT to ONU-1 as a code-division-multiplexed signal that has been code-division-multiplexed together with the encoded transmitting signals of the other channels. The code-division-multiplexed signal is decoded by means of code 1 by the receiving signal processing section 22-1 that the electrical processing section 14-1 of ONU-1 comprises such that the receiving signal of the first channel received by ONU-1 is extracted. The downlink signal sent from the OLT is processed in the same way by the ONU-2 to ONU-4.

The downlink signals of the second, third, and fourth channels from the OLT to the ONU-2, ONU-3, and ONU-4 are converted to encoded transmitting signals that are encoded by means of codes 3, 5, and 7 before being code-division-multiplexed and transmitted from the OLT to the ONU-2, ONU-3, and ONU-4 respectively as a code-division-multiplexed signal. The code-division-multiplexed signal is then decoded by means of codes 3, 5, and 7 by the receiving signal processing sections 22-2, 22-3, and 22-4 that the electrical processing sections 14-2, 14-3, and 14-4 of the ONU-2, ONU-3, and ONU-4 comprise respectively, whereby the receiving signals of the second, third, and fourth channels received by the ONU-2, ONU-3, and ONU-4 respectively are extracted.

The uplink signal will be described next. The uplink signal of the first channel from ONU-1 to the OLT is an encoded transmitting signal that is encoded by means of code 2 by the transmitting signal processing section 24-1 of ONU-1 before being code-division-multiplexed together with the encoded transmitting signals of the other channels and transmitted to the OLT as a code-division-multiplexed signal. The code-division-multiplexed signal is then decoded by means of code 2 by the receiving signal processing section 108 that the electrical processing section 104 of the OLT comprises, whereby the receiving signal of the first channel received by the OLT is extracted. The respective uplink signals of the second to fourth channels are also similarly processed.

The uplink signals of the second, third, and fourth channels from the ONU-2, ONU-3, and ONU-4 to the OLT respectively are converted into encoded transmitting signals that are encoded by means of codes 4, 6, and 8 respectively before being code-division-multiplexed and transmitted to the OLT as a code-division-multiplexed signal. The code-division-multiplexed signal is then decoded by means of codes 4, 6, and 8 by the receiving signal processing section 108 that the electrical processing section 104 of the OLT comprises respectively, whereby the receiving signals of the second, third, and fourth channels received by the OLT are extracted.

As mentioned earlier, the code that is set for the receiving signal processing section 22-1 that the ONU-1 comprises ('code 1' here) and the code that is set for the transmitting signal processing section 24-1 ('code 2' here) are different. That is, the code used for the encoding of the uplink signal of the first channel ('code 2' here) and the code used to encode the downlink signal of the first channel ('code 1' here) are different.

Hence, in the case of the first channel, even when a portion of the uplink signal (encoded by means of code 2) component that is sent from the first channel to the OLT is reflected by the optical connector (the optical connector 61 here) and is mixed with the downlink signal (encoded by means of code 1) that has been sent from the OLT, because the uplink and downlink signals have been encoded by means of different codes (codes 2 and 1 respectively), the uplink signal component is not decoded when the downlink signal is decoded by the ONU-1 of the first channel.

Therefore, even when a portion of the transmitting signal transmitted from ONU-1 is mixed with the receiving signal received by ONU-1 as reflection noise, a situation where the receiving signal cannot be received correctly by the ONU-1 due to the noise component, that is, where the receiving signal cannot be decoded, does not readily occur. The same is also true of the uplink and downlink signals of the second to fourth channels. A portion of the uplink signals that are mixed with the respective downlink signals ONU-1, ONU-2, ONU-3, and ONU-4 is reflected by optical connector 61, optical connector 62, optical connector 63, and optical connector 64 respectively. Although with regard to ONU-1 a portion of the uplink signal is also slightly reflected by optical connectors other than optical connector 61, that is, optical connectors (optical connectors 62, 63, and 64) that are not directly connected to ONU-1, because the star coupler 66 is interposed at a midway point, such reflection is not large enough to be a problem. The same is also true of each of ONU-2, ONU-3, and ONU-4.

As mentioned earlier, even when a portion of the transmitted transmitting signal is mixed with the received receiving signal as reflection noise in each ONU, a situation where the receiving signal cannot be correctly received does not readily occur. Hence, a high-cost part of the low-reflection type need not be used for the optical connector 68 shown in FIG. 1. Further, because the codes of the uplink and downlink signals of the same channel likewise differ for the OLT, even when a portion of the transmitted transmitting signal is mixed with the received receiving signal as reflection noise, a situation where the receiving signal cannot be received correctly does not readily occur. Hence, a high-cost part of the low-reflection type need not be used for the optical connector 72 shown in FIG. 1.

Embodiment B

Figure 9:
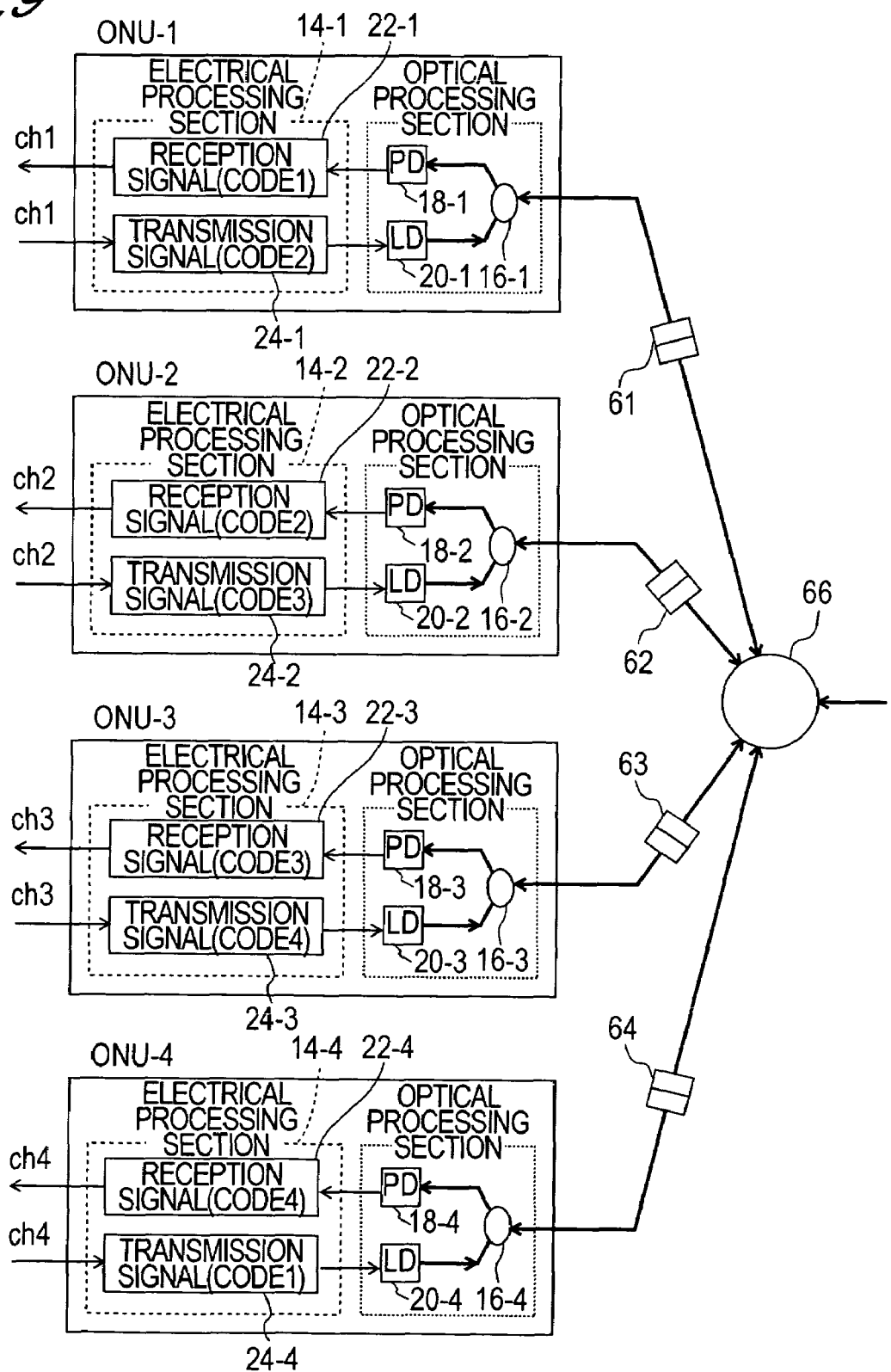
FIG. 9 is a schematic block constitutional view of an optical network unit of an embodiment B of the optical access network system of the second invention.

A selection method other than Embodiment A above which selects code so that the code that is set for the transmitting signal processing section that the ONU comprises and the code that is set for the transmitting signal processing section that the OLT comprises differ for each channel will now be described as Embodiment B with reference to FIG. 9. FIG. 9 is a schematic block constitutional view of the ONU of Embodiment B of the optical access network system of the second invention.

In this selection method, the code that is set for the transmitting signal processing section 24-1 that the ONU-1 of the first channel comprises is code 2 and the downlink signal from the OLT to the ONU-2 of the second channel is also encoded by means of code 2 and transmitted. The code that is set for the transmitting signal processing section 24-2 that the ONU-2 of the second channel comprises is code 3 and the downlink signal from the OLT to the ONU-3 of the third channel is also encoded by means of code 3 and transmitted. The code that is set for the transmitting signal processing section 24-3 that the ONU-3 of the third channel comprises is code 4 and the downlink signal from the OLT to the ONU-4 of the fourth channel is also encoded by means of code 4 and transmitted. The code that is set for the transmitting signal processing section 24-4 that the ONU-4 of the fourth channel comprises is code 1 and the downlink signal from the OLT to the ONU-1 of the first channel is also encoded by means of code 1 and transmitted.

Thus, by setting the code for encoding the transmitting and receiving signals of the first to fourth channels, the code that is set for the receiving signal processing section 22-1 ('code 1' here) that the ONU-1 comprises and the code that is set for the transmitting signal processing section 24-1 ('code 2' here) are different. That is, the code used for the encoding of the uplink signal of the first channel ('code 2' here) and the code used to encode the downlink signal of the first channel ('code 1' here) are different. Further, the code that is set for the receiving signal processing section 22-2 that the ONU-2 comprises ('code 2' here) and the code that is set for the transmitting signal processing section 24-2 ('code 3' here) are different. That is, the code used for the encoding of the uplink signal of the second channel ('code 3' here) and the code used to encode the downlink signal of the second channel ('code 2' here) are different.

Likewise, the code used for the encoding of the uplink signal of the third channel ('code 4' here) and the code used to encode the downlink signal of the second channel ('code 3' here) are different. Furthermore, the code used for the encoding of the uplink signal of the fourth channel ('code 1' here) and the code used to encode the downlink signal of the fourth channel ('code 4' here) are different.

As a result, as per the case of Embodiment A, even when a portion of the transmitting signal is mixed with the receiving signal as reflection noise, a situation where the receiving signal cannot be received correctly due to the noise component, that is, where the receiving signal cannot be decoded, does not readily occur.

As mentioned earlier, even when a portion of the transmitted transmitting signal is mixed with the received receiving signal as reflection noise in each ONU, a situation where the receiving signal cannot be received correctly does not readily occur. Therefore, there is no need to use a high-cost part of the low-reflection type for the optical connector 68 shown in FIG. 1. However, an optical connector of the low-reflection type must be adopted for the optical connector 72 set on the OLT side. Because the same code is used by the transmitting signal processing section 106 and receiving signal processing section 108, a situation where the receiving signal cannot be received correctly does not readily occur as a result of a portion of the transmitting signal from the transmitting signal processing section 106 being mixed with the signal received by the receiving signal processing section 108.

As mentioned earlier, because there may be one OLT constituting the device on the center side, there must also only be one optical connector 72 established upstream of the OLT. Hence, the device costs of the overall system are not largely affected.

The benefit of Embodiment B consists in the fact that new code is not required and it is possible to satisfy the condition that the code used to encode the uplink signal of the kth channel and the code used to encode the downlink signal of the kth channel be different.

Figure 10:
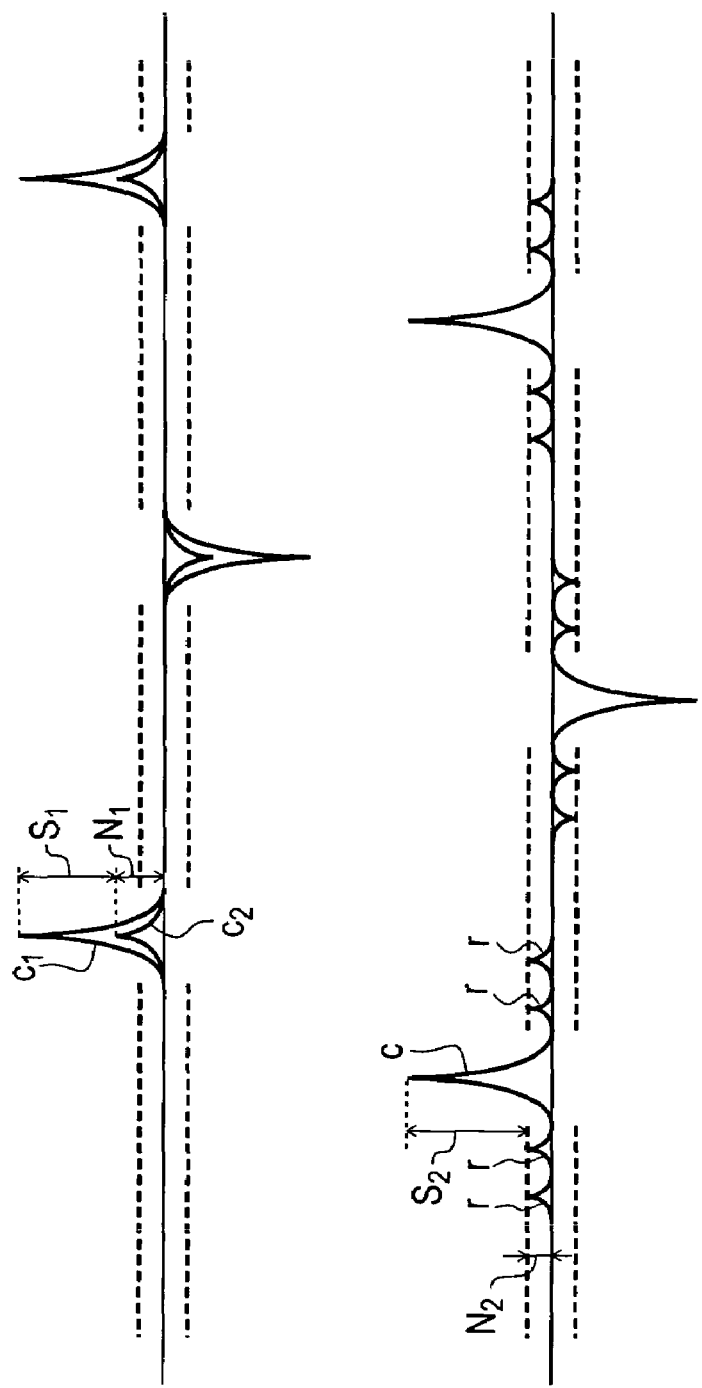
FIG. 10 shows the relationship between the receiving signal and the peak position of an auto-correlation waveform in a case where a signal resulting from the mixing of the reflected transmitting signal is decoded, in the optical access network system of the second invention.

Here, as per the case of the optical access network system of the first invention, a case where a signal resulting from the mixing of the receiving signal and the reflected transmitting signal is decoded will now be described with respect to FIGS. 10A and 10B. FIGS. 10A and 10B show a time waveform of the signal obtained by decoding the signal resulting from the mixing of the receiving signal and the reflected transmitting signal in the optical access network of the second invention as per FIGS. 5A and 5B. The horizontal axis of FIGS. 10A and 10B shows the direction of the time axis and the vertical axis is omitted but the signal intensity is shown in the direction of the vertical axis.

FIG. 10A shows a time waveform obtained by decoding the signal resulting from the mixing of the receiving signal and the reflected transmitting signal when the code for the encoding of the transmitting signal by the ONU and the code for encoding the transmitting signal from the OLT to the ONU, that is, of the receiving signal by the ONU are equal for the same channel. FIG. 10B shows a time waveform obtained by decoding, by means of the same code as the code for encoding the receiving signal by the OLT, a signal resulting from the mixing of the receiving signal and the reflected transmitting signal when the code for the encoding of the transmitting signal by the ONU and the code for the encoding of the transmitting signal to the ONU by the OLT, that is, of the receiving signal by the ONU are different for the same channel.

In FIG. 10A, the peak of the auto-correlation waveform component of the receiving signal is represented by $c_1$ and the peak of the auto-correlation waveform component of the transmitting signal (the component reflected by the optical connector) is represented by $c_2$. Further, in FIG. 10B, the peak of the auto-correlation waveform component of the receiving signal is represented by c and the peak of the cross-correlation waveform component of the transmitting signal (component reflected by the optical connector) is represented by r.

FIGS. 10A and 10B commonly show the time axis is shown sandwiched by two broken lines that run parallel to the time axis at a width that is equal to the absolute value of the peak value of the cross-correlation waveform component of the transmitting signal (component reflected by the optical connector).

The peak of the auto-correlation waveform of the receiving signal (represented by $c_1$) and the peak of the auto-correlation waveform of the transmitting signal (represented by $c_2$) overlap one another when the code for the encoding of the transmitting signal by the ONU and the code for the encoding of the transmitting signal to the ONU by the OLT, that is, of the receiving signal by the ONU are equal for the same channel shown in FIG. 10A. The difference between the two peak values is the net signal component and is indicated by $S_1$ in FIG. 10A. The value of N which provides the S/N ratio in this case is the peak value of the auto-correlation waveform of the transmitting signal and is indicated by $N_1$ in FIG. 10A.

On the other hand, as shown in FIG. 10B, the difference between the value of the peak of the auto-correlation waveform (represented by c) and the value of the peak of the cross-correlation waveform component of the receiving signal (represented by r) when the code for the encoding of the transmitting signal by the ONU and the code for the encoding of the transmitting signal to the ONU by the OLT, that is, of the receiving signal by the ONU, are different for the same channel is the net signal component and is indicated by S2 in FIG. 10B. The value of N which provides the S/N ratio in this case is the peak value of the cross-correlation waveform component of the receiving signal and is indicated by $N_2$ in FIG. 10B.

As shown in FIGS. 10A and 10B, when the two broken lines that run parallel to the time axes are regarded as a reference, $S_1 < S_2$ and $N_1 > N_2$. Hence, the S/N ratio $S_2/N_2$ in a case where the code for the encoding of the transmitting signal by the ONU and the code for the encoding of the transmitting signal to the ONU by the OLT, that is, of the receiving signal by the ONU are different for the same channel shown in FIG. 10B is larger than the S/N ratio $S_1/N_1$ in a case where the code for the encoding of the transmitting signal by the ONU and the code for the encoding of the transmitting signal to the ONU by the OLT, that is, of the receiving signal by the ONU, are equal for the same channel shown in FIG. 10A. That is, $(S_2/N_2) > (S_1/N_1)$. Hence, because the S/N ratio can be increased because the codes are such that the code for the encoding of the transmitting signal by the ONU and the code for the encoding of the transmitting signal to the ONU by the OLT, that is, of the receiving signal by the ONU are different for the same channel, it can be said that the two peak positions are preferably set different in this manner.

Multiple Wavelength Optical Access Network System

Figure 11:
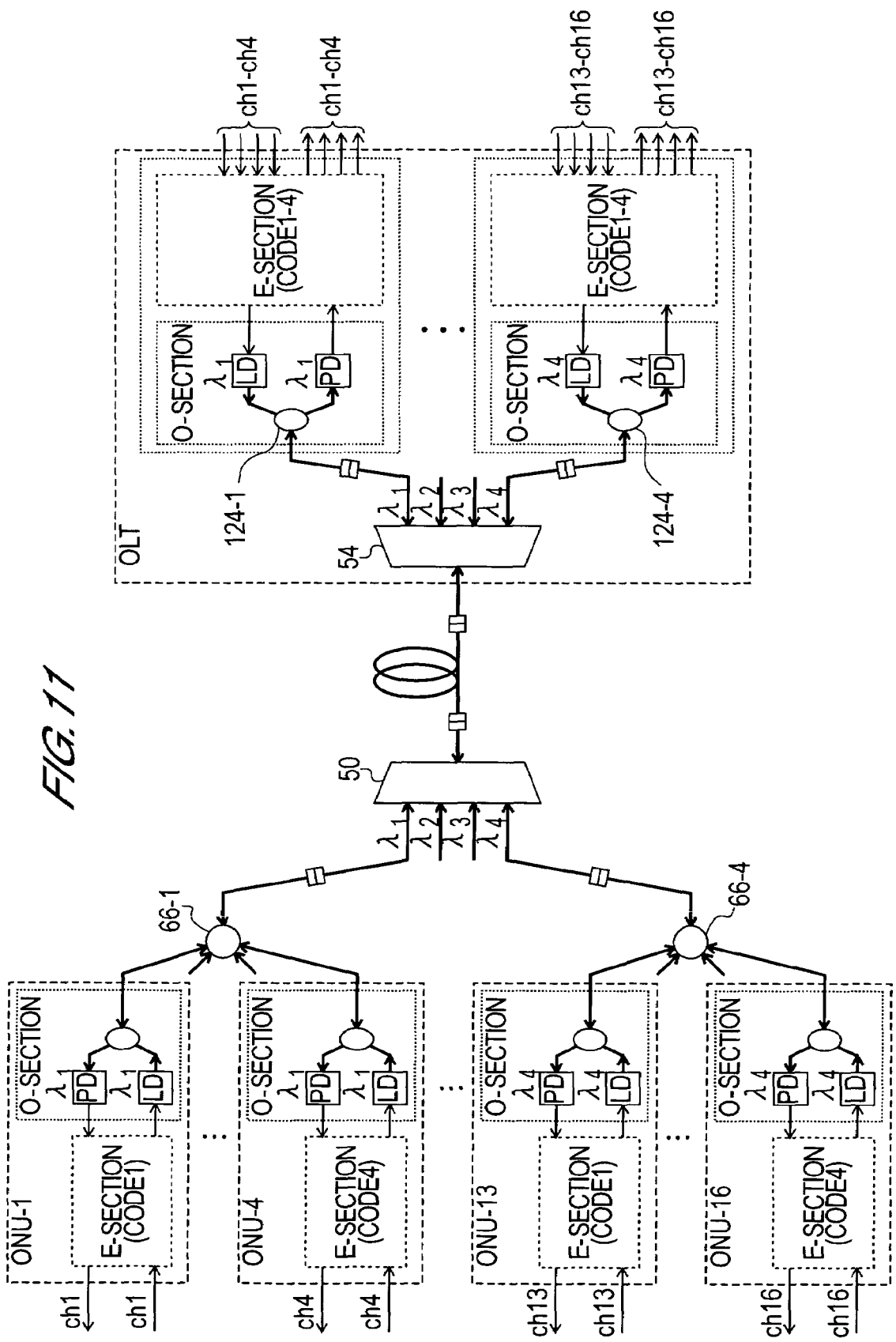
FIG. 11 is a schematic block constitutional view of a multiple wavelength optical access network system.

The constitution and operation of a multiple wavelength optical access network system that is constituted by using the optical access network system of the first and second inventions will now be described with reference to FIG. 11. FIG. 11 is a schematic block constitutional view of a multiple wavelength optical access network system. In the case of the multiple wavelength optical access network system shown in FIG. 11, a case where the number of subscribers is sixteen is assumed. The point of difference of the optical access network systems of Embodiments A and B is that, whereas only type of signal wavelength is used in the communications of the optical access network systems of Embodiments A and B, the optical access network system of the second embodiment is a so-called WDM system that uses four types of wavelengths as the signal wavelengths.

Therefore, the constitution of the parts that perform communications with a signal wavelength of $\lambda_1$ is the same as that of the optical access network system of Embodiment A or Embodiment B. Because the signal wavelengths used are of four types, namely, $\lambda_1$ to $\lambda_4$, the number of users can be extended to a system that is four times the size (ONU-1 to ONU-16). That is, ONU-1 to ONU-4 use wavelength $\lambda_1$, ONU-5 to ONU-8 use wavelength $\lambda_2$, ONU-9 to ONU-12 use wavelength $\lambda_3$, and ONU-13 to ONU-16 use wavelength $\lambda_4$. Further, the code allocated to ONU-1, ONU-5, ONU-9, and ONU-13 can be common code. Likewise, the code allocated to ONU-2, ONU-6, ONU-10, and ONU-14, the code allocated to ONU-3, ONU-7, ONU-11, and ONU-15, the code allocated to ONU-4, ONU-8, ONU-12, and ONU-16 can be common code. Further, the first channel (ch1) to sixteenth channel (ch16) are made to correspond with ONU-1 to ONU-16 respectively. Naturally, the allocation of the above code and the allocation of the channels to the ONU merely illustrates an example and the allocation is not limited thereto.

Because the wavelengths used as the signal wavelengths are increased to four types, namely, $\lambda_1$ to $\lambda_4$, wavelength-selective multiplexers 50 and 54 that possess wavelength selectivity are required between the star couplers 66-1 to 66-4 corresponding with the star coupler 66 of the optical access network system of Embodiment A or Embodiment B and the optical couplers 124-1 and 124-4 that correspond with the optical coupler 124.

A WDM multiplexer, for example, can be used as the wavelength-selective multiplexer with wavelength selectivity. Further, a device that has a star coupler without wavelength selectivity and optical filters of different transmitting wavelengths installed in each port that outputs the split light of the star coupler can also be used.

Also in the case of a multiple-wavelength optical access network system, the constitution of each of the parts for communication using the signal wavelengths $\lambda_1$ to $\lambda_4$ is the same as that for the optical access network system of Embodiment A or B. It is therefore clear that the transmitting and receiving of common high-speed signals is performed and that an effect according to which there is no need to increase the number of wavelengths used to the extent of an optical system of a conventional type is obtained.

What is claimed is:

1. An optical access network system in which a star coupler is provided at one end of an optical fiber transmitting line, comprising an optical line terminal that is joined to the other end of said optical fiber transmitting line, and optical network units that are joined to each of N branching optical fiber transmitting lines (N is a natural number of two or more) formed with N branches by said star coupler, and in which first to Nth channels are allocated sequentially to said N optical network units and bidirectional communication using code-division-multiplexing is performed between said optical line terminal and said N optical network units, wherein each of said N optical network units and said optical line terminal comprises a transmitting signal processing section that generates an encoded transmitting signal by encoding a transmitting signal and outputs said encoded transmitting signal, and a receiving signal processing section that receives an encoded receiving signal that is transmitted after being encoded and decodes said encoded receiving signal to extract and output a receiving signal, said receiving signal processing section comprises a decoding processing circuit that decodes said code-division-multiplexed signal and said decoding processing circuit comprises an analog matched filter and a decision circuit, said analog matched filter comprising an analog shift register, a positive signal adder, a negative signal adder, an analog adder that adds output signals from each of said positive signal adder and said negative signal adders, and a lowpass filter which fulfils the role of blocking the high-frequency noise component by filtering base rate frequency signals among the signals output from said analog adder, and code that is set for said transmitting signal processing section that is comprised in an optical network unit of a kth channel (k is a natural number from 1 to N) which encodes and outputs an uplink signal which is a signal for transmitting from said optical network unit of said kth channel to said optical line terminal, and code that is set for transmitting signal processing section that is comprised in said optical line terminal which encodes and outputs a downlink signal which is a signal for transmitting from said optical line terminal to said optical network unit of said kth channel are mutually different, wherein the code that is set for said transmitting signal processing section that is comprised in an optical network unit of a pth channel (p is a natural number from 1 to N) which encodes and outputs an uplink signal which is a signal for transmitting from said optical network unit of said pth channel to said optical line terminal, and code that is set for said transmitting signal processing section that is comprised in said optical line terminal which encodes and outputs a downlink signal which is a signal for transmitting from said optical line terminal to an optical network unit of a qth channel (q is a natural number of 1 to N) are identical to one another, andsets (p, q) of the natural numbers p and q are limited to N sets which are (1, 2), (2, 3), (3, 4), . . . (p, p+1), . . . (N-1, N) and (N, 1).

* * * * *